United States Patent [19]
Olarig et al.

[11] Patent Number: 6,167,476
[45] Date of Patent: Dec. 26, 2000

[54] APPARATUS, METHOD AND SYSTEM FOR ACCELERATED GRAPHICS PORT BUS BRIDGES

[75] Inventors: Sompong Paul Olarig, Cypress; Usha Rajagopalan; Ronald Timothy Horan, both of Houston, all of Tex.

[73] Assignee: Compaq Computer Corporation, Houston, Tex.

[21] Appl. No.: 09/160,280

[22] Filed: Sep. 24, 1998

[51] Int. Cl.[7] ................................................. G06F 13/38
[52] U.S. Cl. ........................... 710/128; 710/126; 710/129
[58] Field of Search .................................... 710/128, 129, 710/126, 107, 100, 112; 345/520, 521

[56] References Cited

U.S. PATENT DOCUMENTS

| | | |
|---|---|---|
| 5,479,627 | 12/1995 | Khalidi et al. . |
| 5,664,161 | 9/1997 | Fukushima et al. . |
| 5,740,381 | 4/1998 | Yen . |
| 5,793,996 | 8/1998 | Childers et al. .......................... 345/521 |
| 5,802,568 | 9/1998 | Csoppenszky . |
| 5,812,789 | 9/1998 | Diaz et al. . |
| 5,835,962 | 11/1998 | Chang et al. . |
| 5,857,086 | 1/1999 | Horan et al. ............................. 710/126 |
| 5,859,989 | 1/1999 | Olarig et al. ............................ 710/126 |
| 5,889,970 | 3/1999 | Horan et al. ............................. 710/126 |
| 5,892,964 | 4/1999 | Horan et al. .............................. 712/33 |
| 5,937,173 | 8/1999 | Olarig et al. ............................ 710/128 |

OTHER PUBLICATIONS

Halfhill, "Unclogging the PC Bottlenecks", *Byte* Sep. '97, vol. 22, No. 9.

Yong, "AGP Speeds 3D Graphics" *Microprocessor Report*, Jun. 17, 1996.

Brummer, "PCI–to–AGP Move Boosts 3–D Graphics" *Electronic Engineering Times*, 1997, n952, p. 84.

*Primary Examiner*—Ayaz R. Sheikh
*Assistant Examiner*—Xuong Chung-Trans
*Attorney, Agent, or Firm*—Williams, Morgan & Amerson, P.C.

[57] ABSTRACT

A computer system having at least one central processing unit, system memory, and a core logic capable of accepting an AGP bus is provided with an AGP to AGP bridge connected to the standard AGP bus. The AGP to AGP bridge can accommodate two or more AGP-compatible devices that can be accessed through the standard AGP bus via the AGP to AGP bridge. A PCI to memory bridge is also provided within the AGP to AGP bridge so that PCI devices may be connected to the AGP to AGP bridge. The AGP to AGP bridge is fitted with an overall flow control logic that controls the transfer of data to or from the various AGP devices and the standard AGP bus that is connected to the core logic of the computer system. The AGP to AGP Bridge can utilize a standard 32-bit AGP bus as well as (two) dual 32-bit buses to enhance bandwidth. In an alternate embodiment of the invention, the dual 32-bit buses can be combined to form a single 64-bit bus to increase the available bandwidth. Alternate embodiments of the AGP to AGP Bridge can accommodate the single 64-bit AGP bus for increased performance. Another alternate embodiment can accommodate peer-to-peer transfer of data between AGP busses on the bridge.

25 Claims, 27 Drawing Sheets

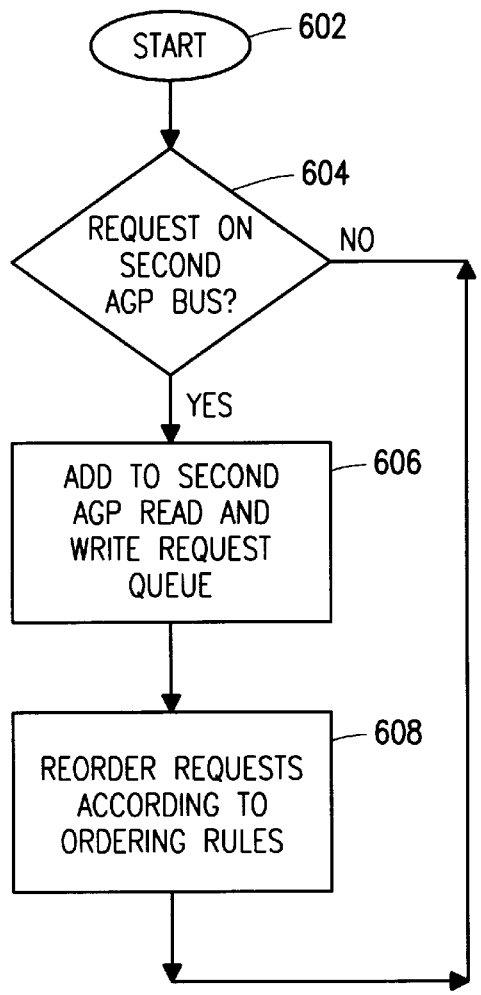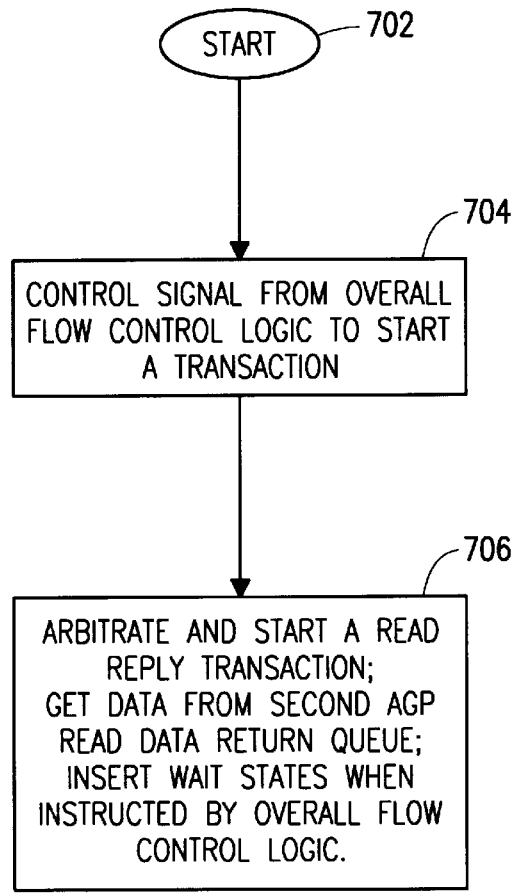
FIGURE 6
FIGURE 7

FOR CONTINUATION SEE FIGURE 13A

FOR CONTINUATION SEE FIGURE 14A

APPARATUS, METHOD AND SYSTEM FOR ACCELERATED GRAPHICS PORT BUS BRIDGES

CROSS REFERENCE TO RELATED APPLICATION

This patent application is related to commonly owned U.S. patent application Ser. No. 08/855,062; filed Jun. 30, 1997; entitled "Apparatus, Method and System for Dual Accelerated Graphics Ports" by Ronald T. Horan, Gary W. Thome and Sompong P. Olarig, and is hereby incorporated by reference for all purposes.

BACKGROUND OF THE INVENTION

1. Field of the Invention

The present invention relates to computer systems using at least one bus bridge to interface with at least one central processing unit, a video graphics processor, random access memory and input-output peripheral devices together, and more particularly, in utilizing at least one bus bridge in a computer system to enable the computer system to interface with more than one input-output device of the same type.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, white boarding, integrated enterprise calendar, virtual engineering design and the like. Multiple network servers may also be interconnected by local area networks ("LAN") and wide area networks ("WAN").

A significant part of the ever-increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high-speed expansion local buses. Most notably, a high speed expansion local bus standard has emerged that is microprocessor independent and has been embraced by a significant number of peripheral hardware manufacturers and software programmers. This high-speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of New Capabilities' Structure," dated May 20, 1996, the disclosures of which are hereby incorporated by reference. These PCI specifications and ECN are available from the PCI Special Interest Group, P.O. Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Cyrix, IBM and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever-larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The proposed Intel AGP 3-D graphics standard defines a high-speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification that provides signal, protocol, electrical, and mechanical specifications for the AGP bus and devices attached thereto. This specification is entitled "Accelerated Graphics Port Interface Specification version 2.0," dated May 4, 1998; and also "Accelerated Graphics Port Interface Specification version 1.0," dated Jul. 31, 1996 are hereby incorporated by reference. The AGP specification, both versions 2.0 and 1.0, are available from Intel Corporation, Santa Clara, Calif.

The AGP interface specification uses the 66 MHz PCI (Revision 2.1) specification as an operational baseline, with three performance enhancements to the PCI specification which are used to optimize the AGP specification for high performance 3-D graphics applications. These enhancements are: 1) pipelined memory read and write operations, 2) de-multiplexing of address and data on the AGP bus by use of side-band signals, and 3) data transfer rates of 133 MHz for data throughput in excess of 500 megabytes per second ("MB/s"). The remaining AGP specification does not modify the PCI specification, but rather provides a range of graphics-oriented performance enhancements for use by 3-D graphics hardware and software designers. The AGP specification is neither meant to replace or diminish full use of the PCI standard in the computer system. The AGP specification creates an independent and additional high speed local bus for use by 3-D graphics devices such as a graphics controller, wherein the other input-output ("I/O") devices of the computer system may remain on any combination of the PCI, SCSI, EISA and ISA buses.

To functionally enable this AGP 3-D graphics bus, new computer system hardware and software are required. This requires new computer system core logic designed to function as a host bus/memory bus/PCI bus to AGP bus bridge meeting the AGP specification, and new Read Only Memory Basic Input Output System ("ROM BIOS") and Application Programming Interface ("API") software to make the AGP dependent hardware functional in the computer system. The computer system core logic must still meet the PCI standards referenced above and facilitate interfacing the PCI bus(es) to the remainder of the computer system. In addition, new AGP compatible device cards must be designed to properly interface, mechanically and electrically, with the AGP bus connector. A suitable computer system employing the AGP specification is shown in FIG. 1. The prior art computer system has at least one central processing unit 102 connected to a host bus 103 which, in turn, is connected to a core logic 104. The core logic 104 is a chipset of components for linking the system random access memory 106 via the memory bus 105 to the host bus 103 and the primary PCI bus 109 through DRAM control 202. The core logic 104 also contains the circuitry related to the AGP bus 107, such as AGP to memory bridge 204 and the PCI to memory bridge 212. An AGP-compliant device, such as the video graphics controller 110, is connected to the AGP bus 107. In this example, a video display 112 is connected to the video graphics controller 110. Various other I/O devices 101 are connected to the primary PCI bus 109.

Both AGP bus transactions and PCI bus transactions may be run over the AGP interface. An AGP master (graphics) device may transfer data to system memory using either AGP transactions or PCI transactions. The core logic 104 can access the AGP master device only with PCI transactions. Traffic on the AGP interface may consist of a mixture of interleaved AGP and PCI transactions. The access request and data queue structures are illustrated in FIG. 2.

AGP transactions are run in a split transaction fashion where the request for data transfer is "disconnected" from the data transfer itself. The AGP master initiates an AGP transaction with an access request. The core logic 104 responds to the access request by directing the corresponding data transfer at a later time. The fact that the access requests are separated from the data transfers allows the AGP master to issue several access requests in a pipelined fashion while waiting for the data transfers to occur. Pipelining access requests results in having several read and/or write requests outstanding in the core logic's request queue 208 (within the AGP to memory bridge 204) at any point in time. The request queue 208 is divided into high priority and low priority sub-queues (not shown), each of which deal with respective accesses according to separate priority and ordering rules. The AGP master tracks the state of the request queue in order to limit the number of outstanding requests and identify data transactions.

The core logic 104 processes the access requests present in its request queue 208. Read data will be obtained from system memory 106 and returned at the core logic's initiative via the read data return queue 206. Write data will be provided by the AGP device at the core logic's direction when space is available in the core logic's write data queue 210. Therefore, AGP transaction traffic will generally consist of interleaved access requests and data transfers.

All PCI transactions on the AGP have their own queues—separate from the AGP transaction queues. Each queue has its own access and ordering rules. Not shown in FIG. 2 is the core logic queue which handles processor accesses directly to the PCI target interface 238 of the AGP master, all of which are executed as non-pipelined PCI bus transactions.

On the other end of the AGP bus 107, the AGP-compliant device (e.g., video graphics controller 110 in FIG. 1) has an AGP interface 230 with read data return queue 232, read/write request queue 234, and write data queue 236 that correspond to the read data return queue 206, read and write request queue 208, and write data queue 210 of the AGP to memory bridge 204 within the core logic 104. The AGP-compliant device also has a PCI target interface 238. The queues within the AGP interface 230 and the PCI target interface 238 are connected to the data source/sink 239 of the device.

AGP and PCI device cards are not physically or electrically interchangeable even though there is some commonality of signal functions between the AGP and PCI interface specifications. The present AGP specification only makes allowance for a single AGP device on an AGP bus. Whereas the PCI specification allows two PCI devices on a PCI bus running at 66 MHz. The single AGP device is capable of functioning in both a 1× mode (264 MB/s peak) and a 2× mode (532 MB/s peak). The AGP bus is defined as a 32-bit bus, or four bytes per data transfer. The PCI bus is defined as either a 32 bit or 64 bit bus, or four or eight bytes per data transfer, respectively. The AGP bus, however, has additional side-band signals which enables it to transfer blocks of data more efficiently than is possible using a PCI bus.

An AGP bus running in the 2× mode provides sufficient video data throughput (532 MB/s peak) to allow increasingly complex 3-D graphics applications to run on personal computers. Some personal computer uses do not require high end 3-D graphics, but would greatly benefit from having an additional AGP card slot for accepting an additional input-output device such as another video graphics card (dual head monitors), a high speed network interface card ("NIC"), a SCSI adapter, a wide area network digital router, and the like. Since the AGP specification is comprised of a superset of the 66 MHz, 32 bit PCI specification, a PCI device may also function on the AGP bus (different card slot connectors for the AGP and PCI device cards would be necessary). Thus, embedded (directly connected to the computer system motherboard) or card slot pluggable AGP and PCI devices could share the same AGP/PCI bus, controller and arbiter of a core logic chipset used in a computer system.

What is needed is a computer system that can accommodate more than one AGP-compatible device and that has increased bandwidth to accommodate the increased number of AGP-compatible devices.

SUMMARY OF THE INVENTION

The present invention overcomes the above-identified problems as well as other shortcomings and deficiencies of existing technologies by providing in a computer system an AGP to AGP bridge that is capable of linking one or more AGP-compatible devices to a standard AGP bus that is connected to a standard AGP-compatible core logic chipset. Specifically, the present invention provides a computer system having at least one central processing unit, system memory, and a core logic capable of accepting an AGP bus. An AGP to AGP bridge is also provided that is connected to the standard AGP bus of the core logic. The AGP to AGP bridge can accommodate two or more AGP-compatible devices that can be accessed through the standard AGP bus via the AGP to AGP bridge. A PCI to memory bridge is also provided within the core logic that is connected to the AGP bus so that PCI devices may be connected to the AGP to AGP bridge and communicate with the core logic. The AGP to AGP bridge is fitted with an overall flow control logic that controls the transfer of data to or from the various AGP devices and the standard AGP bus that is connected to the core logic of the computer system.

In the preferred embodiment of the present invention, the AGP to AGP bridge has a second AGP bus and a third AGP bus. If more than two buses are present on the AGP to AGP bridge, then the control of the internal, multiple FIFOs is managed by having a data flow pointer that keeps track of how many bytes of the returning read data belong to which AGP device. The AGP to AGP bridge of the present invention can utilize a standard 32-bit AGP bus. Furthermore, the AGP to AGP bridge can be constructed as a 64-bit bus that is bifurcated into two (dual) 32-bit buses in order to enhance bandwidth. The latter embodiment allows the dual primary AGP buses to work directly with the standard (32-bit) AGP chipset. To the core logic chipset, each AGP bus behaves fully as a standard AGP device but can operate concurrently. This allows each AGP device to have its own private bus and to run at maximum speed concurrently. Another advantage of this alternate embodiment is that it can support any number of AGP devices/slots on the secondary AGP buses.

In yet another alternate embodiment of the present invention, the dual 32-bit buses can be combined to form a single 64-bit bus to increase the available bandwidth. In this alternate embodiment, the AGP to AGP bridge can be an external application specific integrated circuit (ASIC) that interfaces directly with the standard AGP core logic chipset. To the core logic chipset, the AGP to AGP bridge behaves fully as a superset of the standard 32-bit AGP device. This allows doubling of the bus bandwidth without running the bus at higher clock frequencies, i.e. 2×66 MHz. Currently, most AGP devices could not meet the AC timing at 66 MHz. Therefore, this alternate embodiment is the only viable solution for doubling the bus bandwidth without running the bus at 133 MHz. In yet another alternate embodiment, the AGP to AGP bridge can accommodate the single 64-bit AGP bus (connected to a special 64-bit core logic chipset) for increased performance.

In yet another alternate embodiment of the present invention, the AGP to AGP bridge acts as a bus repeater and allows the AGP to AGP bridge to work with standard "off-the-shelf" bi-directional transceivers or FIFOs. The alternate embodiment enables the AGP bus to be extended, thus allowing the computer system to support more than one AGP device/slot. However, this alternate embodiment adds additional latency to all the bus transactions and requires the core logic chipset to control the data flow from both directions.

Other and further features and advantages will be apparent from the following description of presently preferred embodiments of the invention, given for the purpose of disclosure and taken in conjunction with the accompanying drawings.

BRIEF DESCRIPTION OF THE DRAWINGS

FIG. 6 is a flowchart of the function of the Second AGP Bus Request Interface of the present invention;

FIG. 7 is a flowchart of the function of the Second AGP Bus Reply Interface of the present invention;

DETAILED DESCRIPTION OF THE PREFERRED EMBODIMENTS

Figure 1:
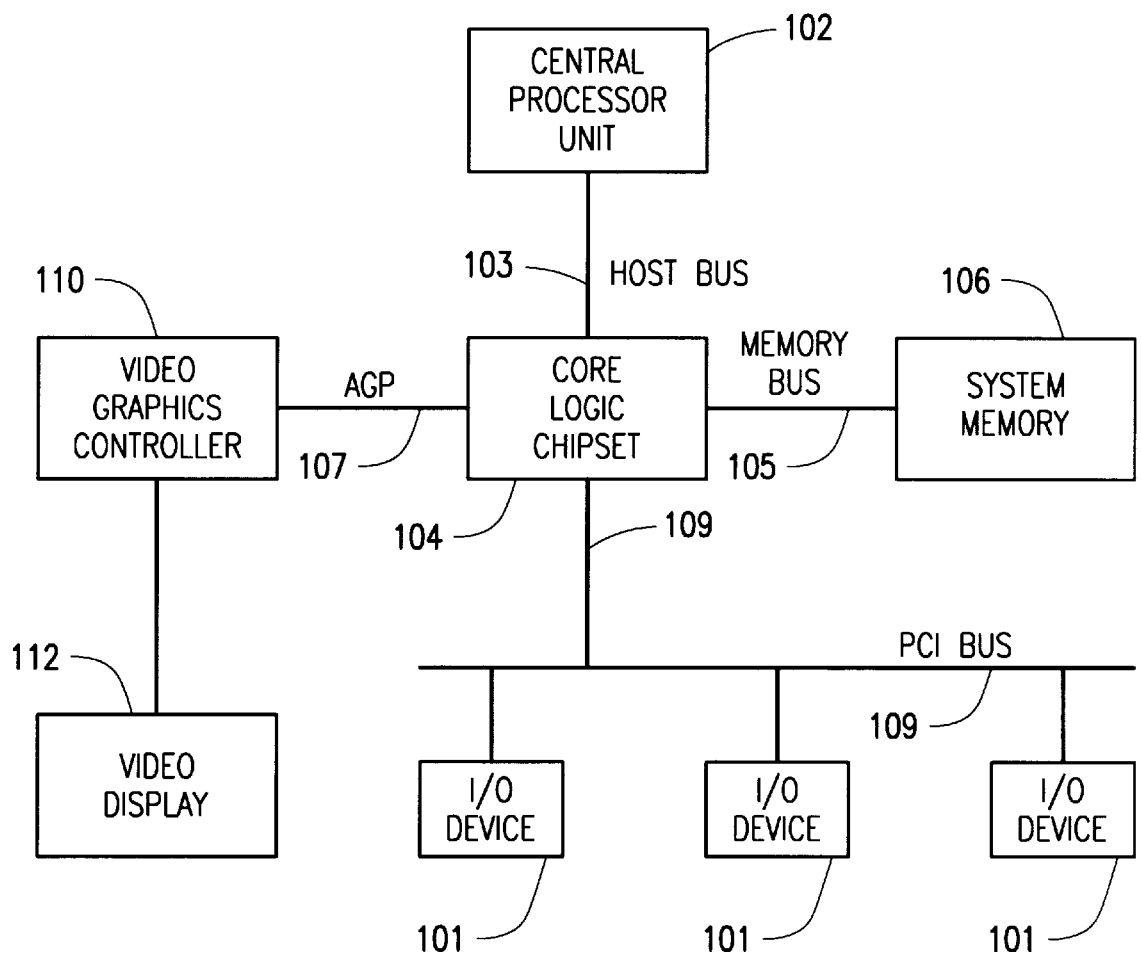
FIG. 1 is a block diagram of a prior art computer system.
Figure 2:
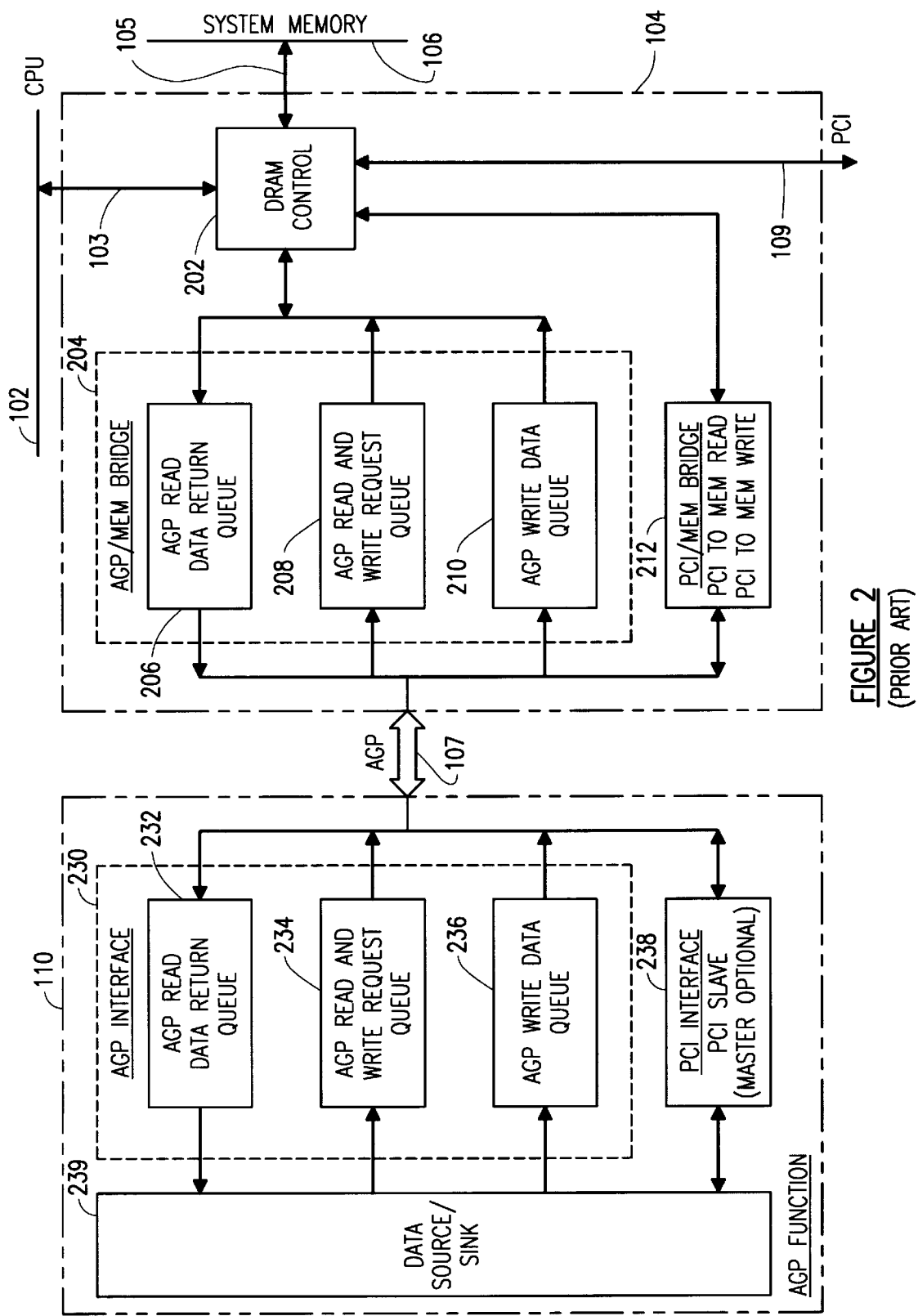
FIG. 2 is a block diagram of a prior art AGP device interface with the core logic of a computer system.

The present invention is an apparatus, method and system for providing an AGP to AGP bus in a computer system that is capable of allowing multiple AGP devices to be connected to a single AGP bus on a core logic chipset.

The AGP bus was developed to have sufficient data bandwidth for a video controller in a computer system, up to 532 megabytes per second ("MB/s"), to run increasingly complex three dimensional ("3-D") graphics applications such as, for example, games and engineering simulations. Not all computer applications, however, require the capability of running 3-D graphics at 532 MB/s, but would greatly benefit by having an additional AGP card slot or PCI card slot for another video graphics card, a high speed NIC, a SCSI adapter, a wide area network digital router, or the like. Computers used as network servers or workstations would greatly benefit by having the ability to use two AGP devices, or an AGP device and a PCI device at a combined data transfer rate of 532 MB/s or 264 MB/s per device. In addition, disclosed hereinbelow is an embodiment of the present invention that is capable of data transfer rates of 532 MB/s for each AGP device.

For illustrative purposes, preferred embodiments of the present invention are described hereinafter for computer systems utilizing the Intel x86 microprocessor architecture and certain terms and references will be specific to that processor platform. AGP and PCI are interface standards, however, that are hardware independent and may be utilized with any host computer designed for these interface standards. It will be appreciated by those skilled in the art of computer systems that the present invention may be adapted and applied to any computer platform utilizing the AGP and PCI interface standards.

The PCI specifications referenced above are readily available and are hereby incorporated by reference. The AGP specification referenced above is readily available from Intel Corporation, and is hereby incorporated by reference. Further definition and enhancement of the AGP specification version 1.0 referenced above is more fully defined in "Compaq's Supplement to the 'Accelerated Graphics Port Interface Specification Version 1.0'," Revision 0.8, dated Apr. 1, 1997, and was included in commonly owned co-pending U.S. patent application Ser. No. 08/853,289, filed May 9, 1997, entitled "Dual Purpose Apparatus, Method and System for Accelerated Graphics Port and Peripheral Component Interconnect" by Ronald T. Horan and Sompong P. Olarig, and which is hereby incorporated by reference.

Referring now to the drawings, the details of preferred embodiments of the present invention are schematically illustrated. Like elements in the drawings will be represented by like numbers, and similar elements will be represented by like numbers with a different lower case letter suffix. Referring now to FIG. 3, a schematic block diagram of a computer system utilizing the present invention is illustrated. A computer system is generally indicated by the numeral 100 and comprises a central processing unit 102 ("CPU"), core logic 104, system random access memory 106 ("RAM"), a video graphics controller 110, a local frame buffer 108, a video display 112, a PCI/SCSI bus adapter 114, a PCI/EISA/ISA bridge 116, and a PCI/IDE controller 118. Multiple video graphics controllers 110, local frame buffers 108 and video displays 112 can be added to the added to the computer system 100. Single or multilevel cache memory (not illustrated) may also be included in the computer system 100 according to the current art of microprocessor computer systems. The central processing unit 102 may be a plurality of CPUs 102 in a symmetric or asymmetric multi-processor configuration.

The central processing unit 102 is connected to the core logic 104 through a host bus 103. The system RAM 106 is connected to the core logic 104 through a memory bus 105. The video graphics controller(s) 110 is connected to the core logic 104 through the first AGP bus 107. The video graphics controller 110 is an AGP-compatible device in that it is capable of being connected to and accept/write messages from/to the first AGP bus 107. Video graphics controllers are not the only devices that are AGP-compatible. Other devices, such as a second I/O device 166 may have this capability. In the preferred embodiment of the present invention, two AGP devices may be connected to AGP to AGP bridge 160. In the preferred embodiment of the present invention, the AGP to AGP bridge 160 is an application specific integrated circuit (ASIC) that interfaces directly with the standard AGP chipset 104. To the core logic 104 chipset, the AGP to AGP bridge 160 behaves fully as a standard AGP device. Therefore, the 32-bit version of the AGP to AGP bridge 160 of the present invention does not require any special side-band control signals other than the standard AGP bus protocol as would be required by a bus repeater. However, the 64-bit version of the AGP to AGP bridge 160 of the present invention would require a special side-band control signal. Finally, in an alternate embodiment of the present invention, a bus repeater could be substituted for the AGP to AGP bridge 160.

In the preferred embodiment of the present invention, the AGP to AGP bridge 160 links two AGP buses to the first AGP bus 107. This allows the control of the internal FIFOs to be simplified. An internal arbiter in the flow control logic 260 (see FIG. 4a) can keep track of the outstanding requests on the primary (first) AGP bus based upon the currently active bus grant signal. However, in an alternate embodiment of the present invention, the AGP to AGP bridge 160 may be expanded to include any number of AGP buses for each AGP to AGP bridge 160, such as a fourth AGP bus 168 as shown in FIG. 3. In this alternate embodiment, the control of the internal multiple FIFOs can be managed by having a data flow pointer within the flow control logic 260 that keeps track of how many bytes of the returning read data belong to which AGP device. In either embodiment, by linking the AGP to AGP bridge 160 to the first AGP bus 107, the trace length between the AGP device and the core logic 104 is increased moderately. However, the point-to-point lengths (e.g., between the core logic 104 and the first AGP interface target and arbiter 248 is reduced, thereby allowing the AGP devices to run at a higher (or maximum) clock frequency. This configuration allows each AGP port to run at its maximum speed without additional electrical loading while maintaining signal integrity. Furthermore, use of the AGP to AGP bus 160 allows the AGP devices attached thereto to reside farther away, physically, from the core logic 104 (i.e., the motherboard) that was heretofore possible, enabling a wider range of choices for the physical configuration of the computer system.

Figure 16:
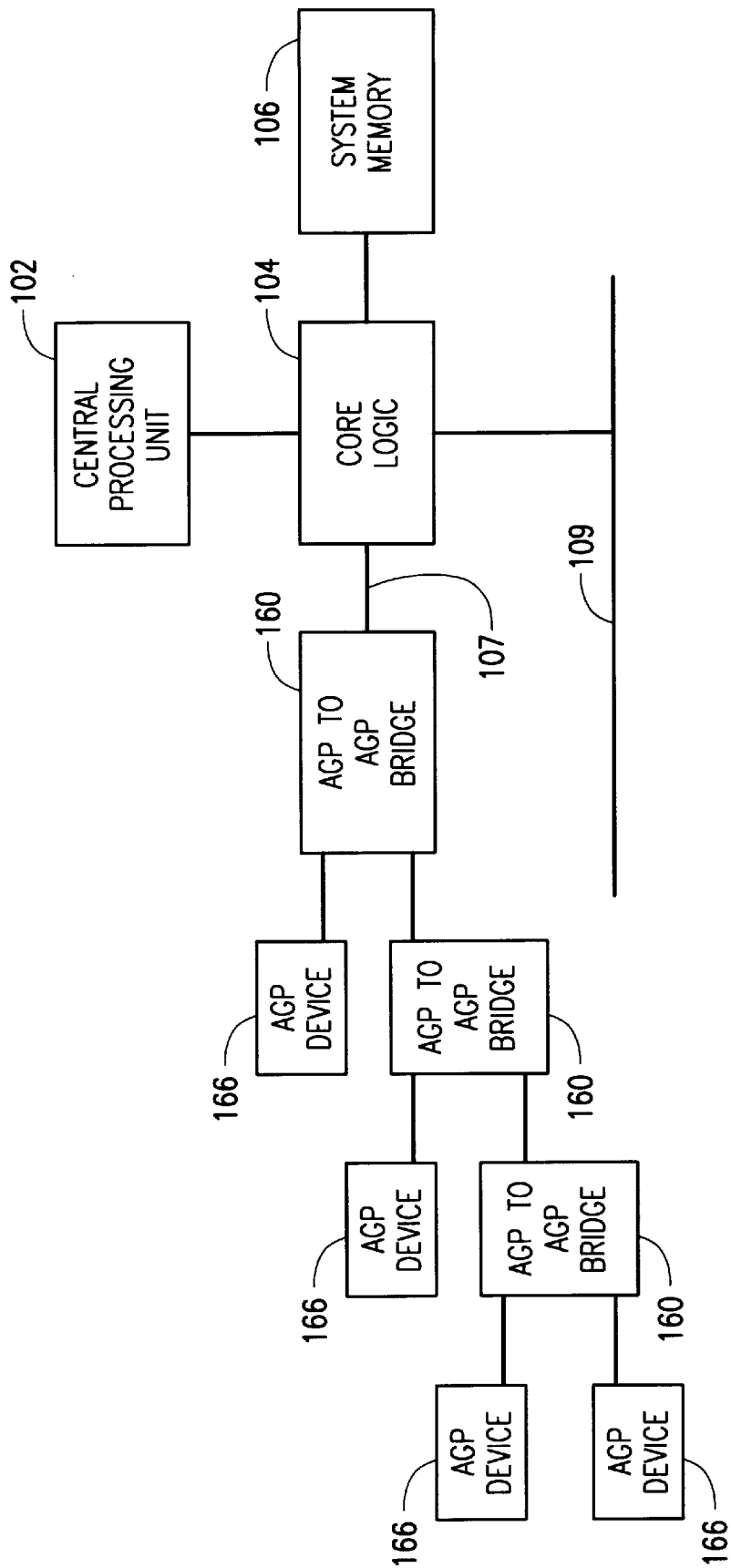
FIG. 16 is a block diagram of an alternate embodiment of the present invention.

Alternatively, the preferred embodiment of the AGP to AGP bridge 160 (i.e., one that connects two AGP buses to the standard single AGP bus), may be connected to other AGP to AGP bridges 160 in a tree like structure in order to obtain the desired number of AGP devices 166 as shown in FIG. 16.

In yet another alternate embodiment of the present invention, the AGP to AGP bridge is replaced with a bus repeater. In this embodiment, the bus repeater utilizes "off-the-shelf" bidirectional transceivers or FIFOs. This alternate embodiment enables an even wider range of choices for the physical placement of the AGP devices, which can be located remotely from the core logic unit and allows the computer system to support more than one AGP device/slot. However, this alternate embodiment adds additional latency to all the bus transactions and requires the core logic chipset to control the data flow from both directions.

Figure 3A:
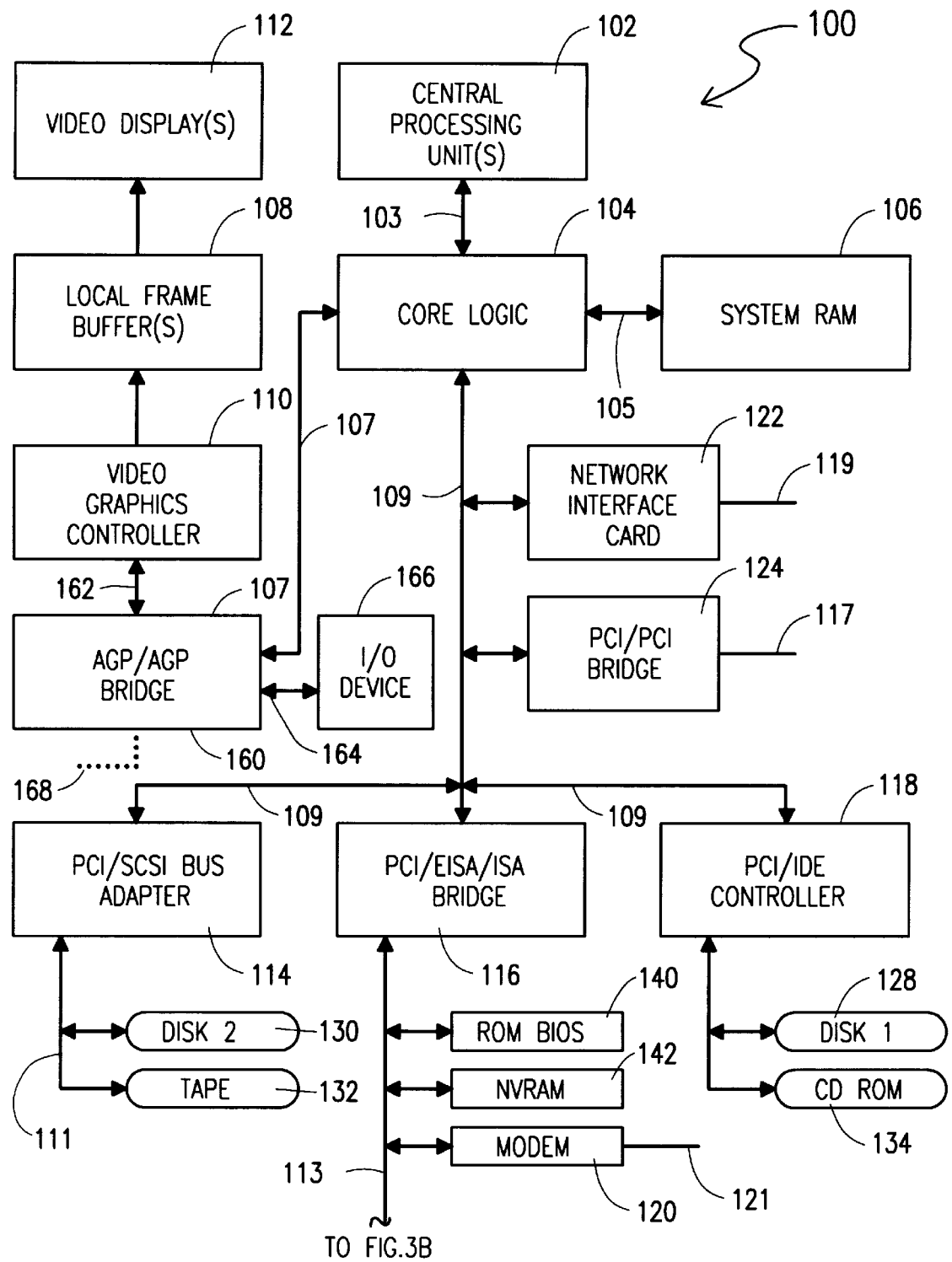
FIGS. 3A, 3B is a block diagram of a computer system of the present invention.
Figure 3B:
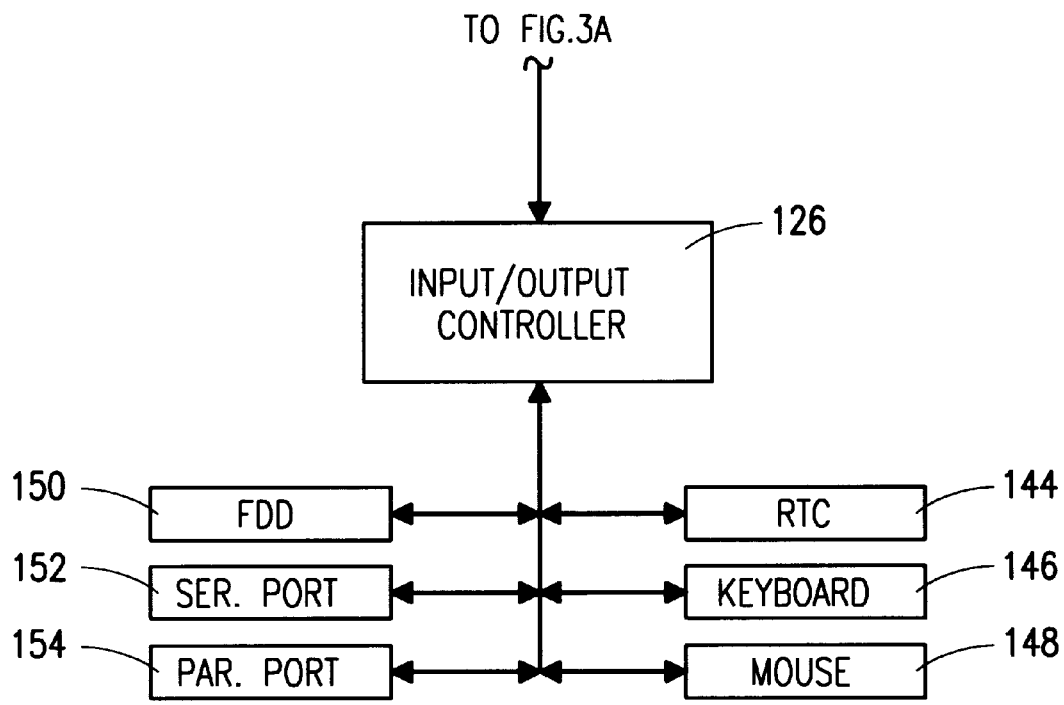

As shown in FIGS. 3A, 3B, The PCI/SCSI bus adapter 114, PCI/EISA/ISA bridge 116, and PCI/IDE controller 118 are connected to the core logic 104 through a primary PCI bus 109. Also connected to the PCI bus 109 are a network interface card 122 ("NIC") and a PCI/PCI bridge 124. Some of the PCI devices such as the NIC 122 and PCI/PCI bridge 124 may plug into PCI connectors on the computer system 100 motherboard (not illustrated).

Again referring to FIGS. 3A, 3B, hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM-BIOS 140, non-volatile random access memory 142 ("NVRAM"), modem 120, and input-output controller 126. The modem 120 connects to an telephone line 121. The input-output controller 126 interfaces with a keyboard 146, real-time clock 144 ("RTC"), mouse 148, floppy disk drive 150 ("FDD"), as well as serial port 152 and parallel port 154. A CD ROM drive 134 and a disk drive 128 can be connected to PCI/IDE controller 118. The EISA/ISA bus 113 is a slower information bus than the PCI bus 109, but it costs less to interface with the EISA/ISA bus 113.

AGP, being a superset of PCI, uses the PCI signals along with some side band signals in order to operate. The AGP side band signals are PIPE#, RBF#, and ST[2:0]. The optional AGP signals are side-band address ports SBA[7:0], AD_STB[1:0], and SB_STB. The above-mentioned signals can be used for performance enhancements, such as 2× (double-speed) mode and side-band addressing. The AGP-compliant device must also be a PCI slave (although PCI master status is optional). The use of side-band signaling enables the transfer of data on both the rising and falling edge of the clock cycle, effectively doubling the data transfer rate. The AGP-compliant device ("AGP device") is an AGP master only, and the core logic 104 acts as an AGP target only.

In the preferred embodiment of the present invention, the first AGP bus 107 is a standard 32-bit bus. However, in an alternate embodiment of the present invention, the AGP bus 107 may consist of a 64-bit bus that acts as two dual 32-bit AGP buses. An alternate embodiment of the AGP to AGP bridge 160 of the present invention can utilize the dual 32-bit buses to enhance bandwidth, or, alternatively, the preferred embodiment of the AGP to AGP bridge 160 of the present invention can be fitted onto each of the dual 32-bit AGP buses, thereby allowing secondary and tertiary AGP buses. This alternate embodiment allows the dual primary AGP buses to work directly with the standard AGP chipset. To the core logic chipset, each AGP bus behaves fully as a standard AGP device but can operate concurrently. This allows each AGP device to have its own private bus and to run at maximum speed concurrently. Another advantage of this alternate embodiment is that it can support any number of AGP devices/slots on the secondary AGP buses.

In yet another alternate embodiment of the present invention, the 64-bit bus is not bifurcated. Instead, the 64-bit bus is utilized (with a special core logic chipset) to increase the available bandwidth. In this alternate embodiment, the AGP to AGP bridge can be an external ASIC that interfaces directly with the standard AGP core logic chipset. To the core logic chipset, the AGP to AGP bridge behaves fully as a superset of the standard 32-bit AGP device. This allows doubling of the bus bandwidth without running the bus at higher clock frequencies, i.e. 2×66 MHz. Currently, most AGP devices may not meet the AC timing at 66 MHz. Therefore, this alternate embodiment may be the only viable solution for doubling the bus bandwidth without running the bus at 133 MHz. An alternate embodiment of the AOP to AGP bridge can accommodate the single 64-bit AGP bus for increased performance.

In yet another embodiment of the present invention, the first AGP bus 107 is a 64-bit bus that is utilized as a single 64-bit AGP bus. The 64-bit bus provides additional data bandwidth for the agent or system that requires it. In this alternate embodiment, the AGP to AGP bridge 160 can be an external ASIC that interfaces directly with the core logic 104 without requiring modification of the core logic 104. To the core logic 104, the AGP to AGP bridge 160 with the 64-bit AGP bus 107 behaves as a superset of the standard 32-bit AGP device. This alternate embodiment allows the doubling of the bus bandwidth without running the bus at higher clock frequencies, i.e., the effective bandwidth is twice that of the current 66 MHz clock speed. This relieves the necessity of running the first AGP bus 107 at 133 MHz to obtain acceptable bandwidth.

When running the two 32-bit buses as a single 64-bit bus, the following signals are needed for 64-bit operation, Request (REQ64#), ACK64#, C/BE[7:4]#, AD[63:32], and ST[3:2]. In this scenario, the 64-bit agent must default to 32-bit mode unless a 64-bit transaction is negotiated. Since there is only one AGP device supported by the standard core logic 104 chipset, the 64-bit bus transaction can be statically negotiated during POST. REQ64# can be drive low by the AGP 64-bit master and ACK64# can be asserted low by the 64-bit device target. This situation is unlike the PCI which are dynamically negotiated once per transaction between the master and the target. If REQ64# and ACK64# are not both active, then the standard 32-bit AGP bus operation is performed instead of the 64-bit bus operation. Both REQ64# and ACK64# are externally pulled up to ensure proper behavior when mixing 32-bit and 64 bit agents if multiple AGP agents are supported.

Although there is no ordering relationship between AGP and PCI, the AGP specification does have some ordering requirements. First, the AGP-compliant target must return read data in the same order as it was requested. Second, AGP write operations are processed by the AGP-compliant target in the order in which they are requested. Third, read data that is returned will be coherent with previously issued AGP write requests. Fourth, an AGP write may bypass one or more previously issued AGP read operations. The fifth requirement is that PCI transactions initiated by an AGP-compliant master or AGP-compliant target must follow the ordering rules specified in the PCI specification. Sixth, high priority reads and writes have the highest priority for memory services. Seventh, an AGP flush command will return after all previous low priority and high priority write commands have been completed. The final requirement is that an AGP fence command forces write commands after itself in order not to pass any read commands before itself.

Figure 4A:
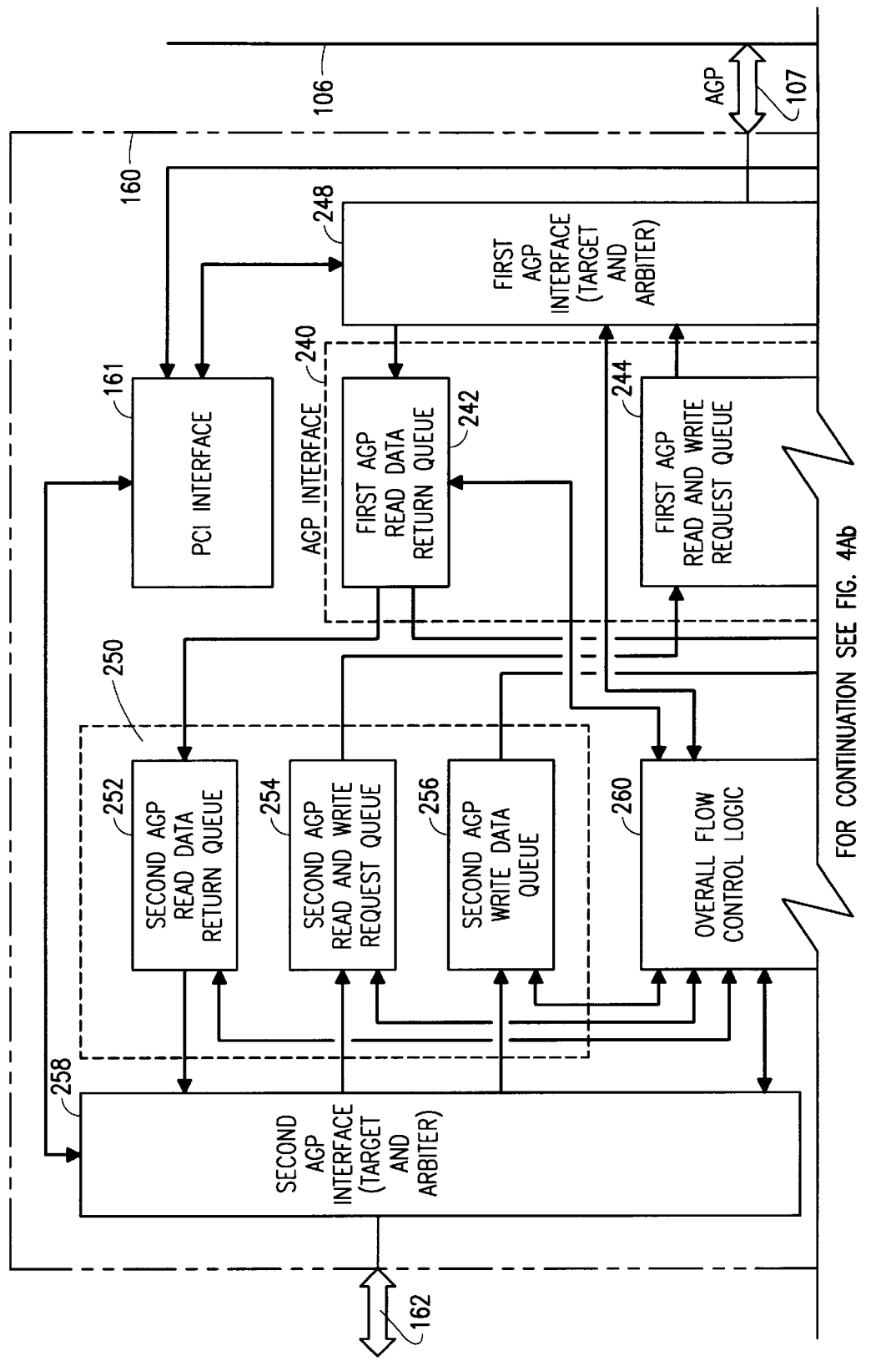
FIGS. 4A, 4A*b* is a block diagram of an embodiment of the AGP to AGP bridge of the present invention.
Figure 4A:
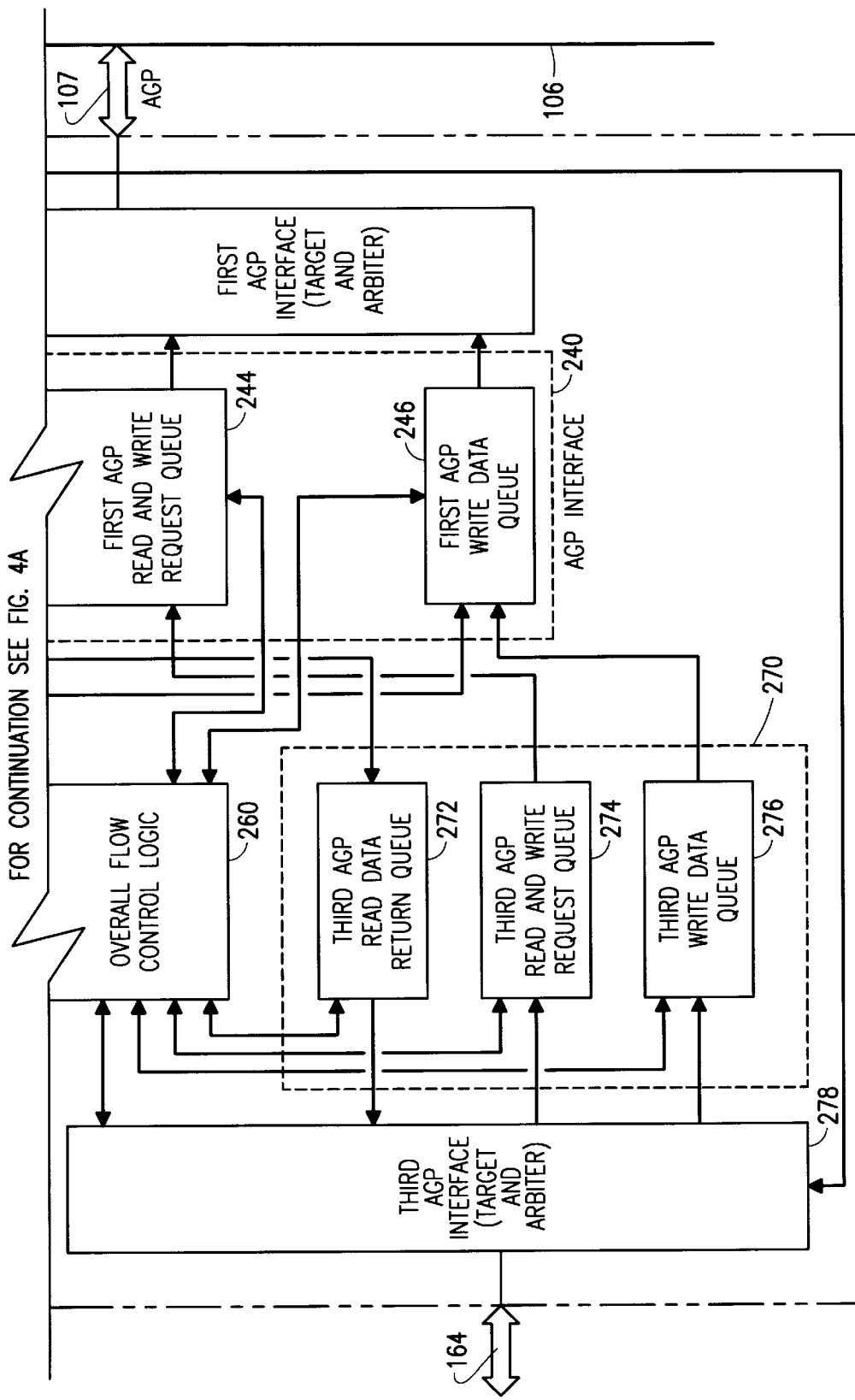

The system architecture of the AGP to AGP bridge 160 of the present invention is shown in FIG. 4a. The AGP to AGP bridge 160, in support of the AGP specification, has a PCI interface 161, with the remainder of the bridge 160 being devoted to AGP-related transactions. The PCI interface 161 is connected to the first interface target and arbiter 248. The PCI interface 161 is also connected to the second interface target and arbiter 258 and to the third interface target and arbiter 278. Because there are no ordering requirements between the PCI and the AGP transactions, the PCI and the AGP sections can act independently of each other. The AGP to AGP bridge 160 of the present invention therefore allows other I/O controllers to take advantage of the AGP bus in systems that are not fully utilizing the AGP bus bandwidth.

FIGS. 4A, 4A*b* shows two AGP buses, the second AGP bus 162 and the third AGP bus 164, both being bridged into a single first AGP bus 107. The first AGP bus 107 is connected to the core logic 104. Each bus has a read/write request queue, a read data return queue, and a write data queue. As mentioned before, AGP transactions are split transactions. Read and write requests are queued up initially and then each request is serviced one-by-one according to the ordering relationship mentioned above. The AGP to AGP bridge 160 is a target on the second AGP bus 162 and the third AGP bus 164. Consequently, an arbiter is required for the second AGP bus 162 and the third AGP bus 164. The AGP to AGP bridge 160 is a master on the first AGP bus 107.

In the preferred embodiment of the present invention, the AGP to AGP bridge 160 of the present invention has three sets of AGP interfaces, each of which contains three queues. As per the AGP specification, the first AGP interface 240 has a first read data return queue 242, first read and write request queue 244, and a first write data queue 246. The first read data return queue 242 must have a minimum of 72 bytes. In the preferred embodiment of the present invention, the first read data return queue should have 296 bytes to ensure adequate performance. Of the 296 bytes, 40 bytes should be reserved for RBF# (Read Buffer Full) spillover. The RBF# spillover is to be used when the master interface on the first AGP bus 107 has asserted an RBF# after the target has initiated a response. In this case, the master must have a few bytes of buffer space in order to receive the read data from the target. This is for compliance with the AGP specification, which requires that a generic AGP device must have 40 bytes of buffer space available for this purpose.

The first AGP interface 240 is of conventional design so that, to the first AGP bus 107, the AGP to AGP bridge 160 appears to be just a standard AGP device and is thus treated as such. Furthermore, the AGP to AGP bridge 160 card fits into a standard AGP port that is connected to the first AGP bus 107. This enables any computer system with an AGP-compatible core logic and AGP port to accommodate the present invention without any hardware changes whatsoever.

The first AGP interface 240 is connected to the second AGP interface 250 and the third AGP interface 270 as shown in FIGS. 4A, 4A*b*. The second AGP interface 250 is connected to the second interface target and arbiter 258. Similarly, the third interface target and arbiter 278 is connected to the third AGP interface 270. The second AGP interface 250 has a second read data return queue 252, a second read and write request queue 254, and a second write data queue 256 that correspond to the three queues in the first AGP interface 240. The second read data return queue 252 must have a minimum of 32 bytes. The third AGP interface 270 has a third read data return queue 272, a third read and write request queue 274, and a third write data queue 276. The third read data return queue 272 must have a minimum of 32 bytes. The second read data return queue 252 is connected to the first read data return queue 242.

Similarly, the third read data return queue 272 is also connected to the first read data return queue 242 as shown in FIG. 4*a*. Likewise, the second read and write request queue 254 and the third read and write request queue 274 are both connected to the first read and write request queue 244. Finally, the second write data queue 256 and the third write data queue 276 are connected to the first write data queue 246. The first write data return queue 246, the second write data return queue 256, and the third write data return queue 274 all must have a minimum of 64 bytes available because 64 bytes is the size of the longest write on an AGP bus. All of the elements within the AGP to AGP bridge 160, with the sole exception of the PCI interface 161, are connected to the flow control logic 260 as shown in FIGS. 4A, 4A*b*. The PCI interface 161 is an intermediary that connects the first AGP interface. The function of the flow control logic 260 will be explained below.

Figure 4B:
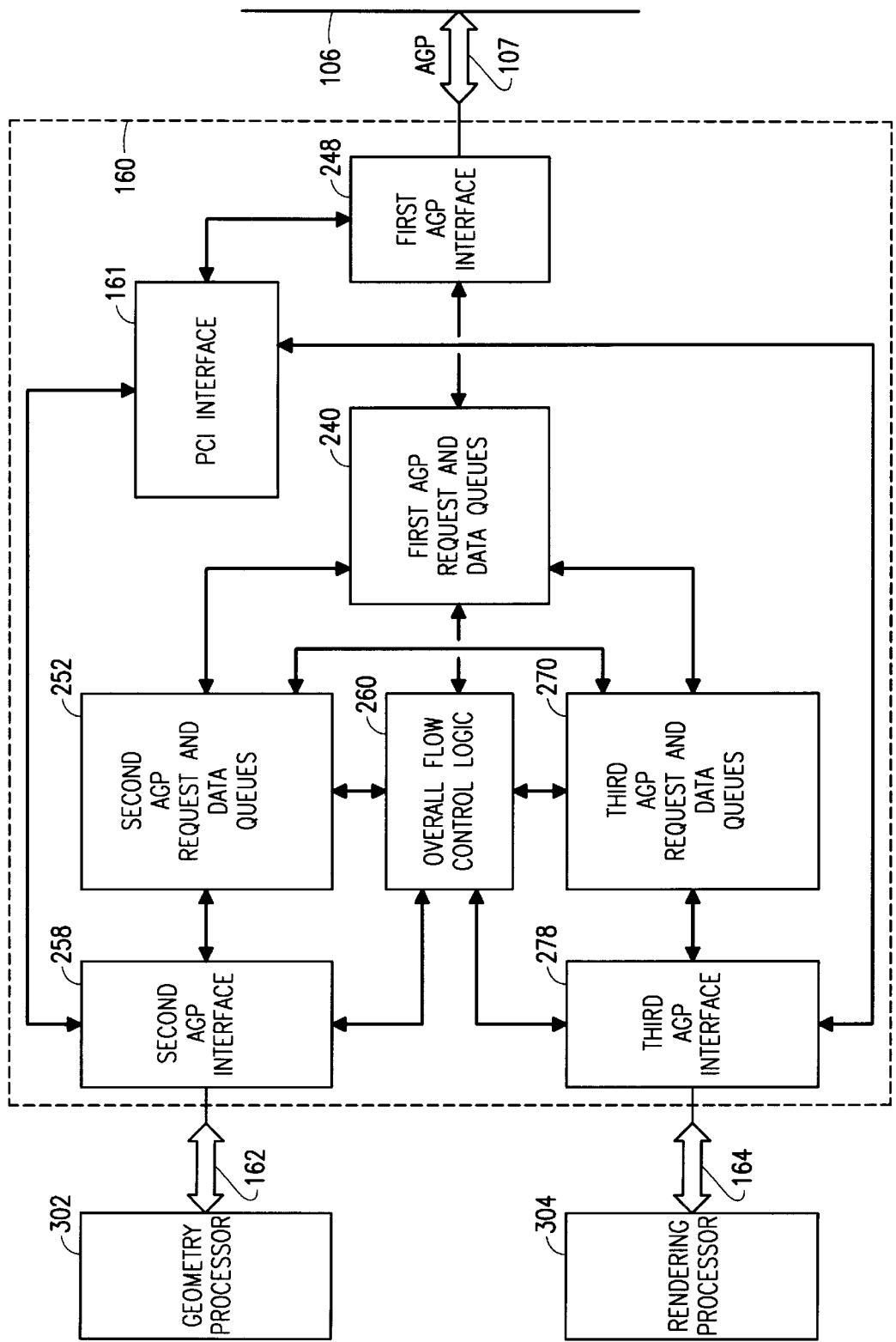
FIG. 4*b* is a block diagram of the preferred embodiment utilizing the AGP to AGP bridge of the present invention.

FIG. 4*b* shows a block diagram of the preferred embodiment of the present invention, wherein the AGP to AGP bridge 160 (as shown in FIGS. 4A, 4A*b*) connects a geometry processor 302 and a rendering processor 304 to the first AGP bus 107. A geometry processor is used to generate triangles and geometric vertices. The output of the geometry processor 302 is then passed to the rendering processor 304 which performs post processing and forwards the resultant information to the graphics display (e.g., a monitor or screen). In the typical scenario, the geometry processor 302 obtains raw data from the CPU 102 or the system memory 106 via the core logic 104, the AGP bus 107, and the AGP to AGP bridge 160. Similarly, the rendering processor 304 receives texture data (typically from the system memory 106) via the AGP to AGP bridge 160. As shown in FIG. 4*b*, the geometry processor 302 is connected to the AGP to AGP bridge 160 via the second AGP bus 162. Similarly, the rendering processor 304 is connected to the AGP to AGP bridge 160 via the third AGP bus 164. A separate connection between the second AGP Request and Data Queues 252 and the third AGP Request and Data Queues 270 is included in the present invention as shown in FIG. 4*b*. The separate connection between second AGP Request and Data Queues 252 and the third AGP Request and Data Queues 270 enables direct transfer of geometric vertices and other data from the geometry processor 302 to the rendering processor 304 without tying up bandwidth or other resources outside of the AGP to AGP bridge 160. Furthermore, if necessary, the overall flow control logic 260 can enable information to be transferred to both the geometry processor 302 and the rendering processor 304 simultaneously. More importantly, however, the geometry processor 302 can communicate with the rendering processor 304 without having to go through the core logic 104. This relieves the control logic 104 to perform other tasks, thereby increasing the overall performance of the computer system. More detail of the preferred embodiment of the AGP to AGP bridge can be found later in the discussion of FIGS. 4E, 4E*b*.

Figure 4C:
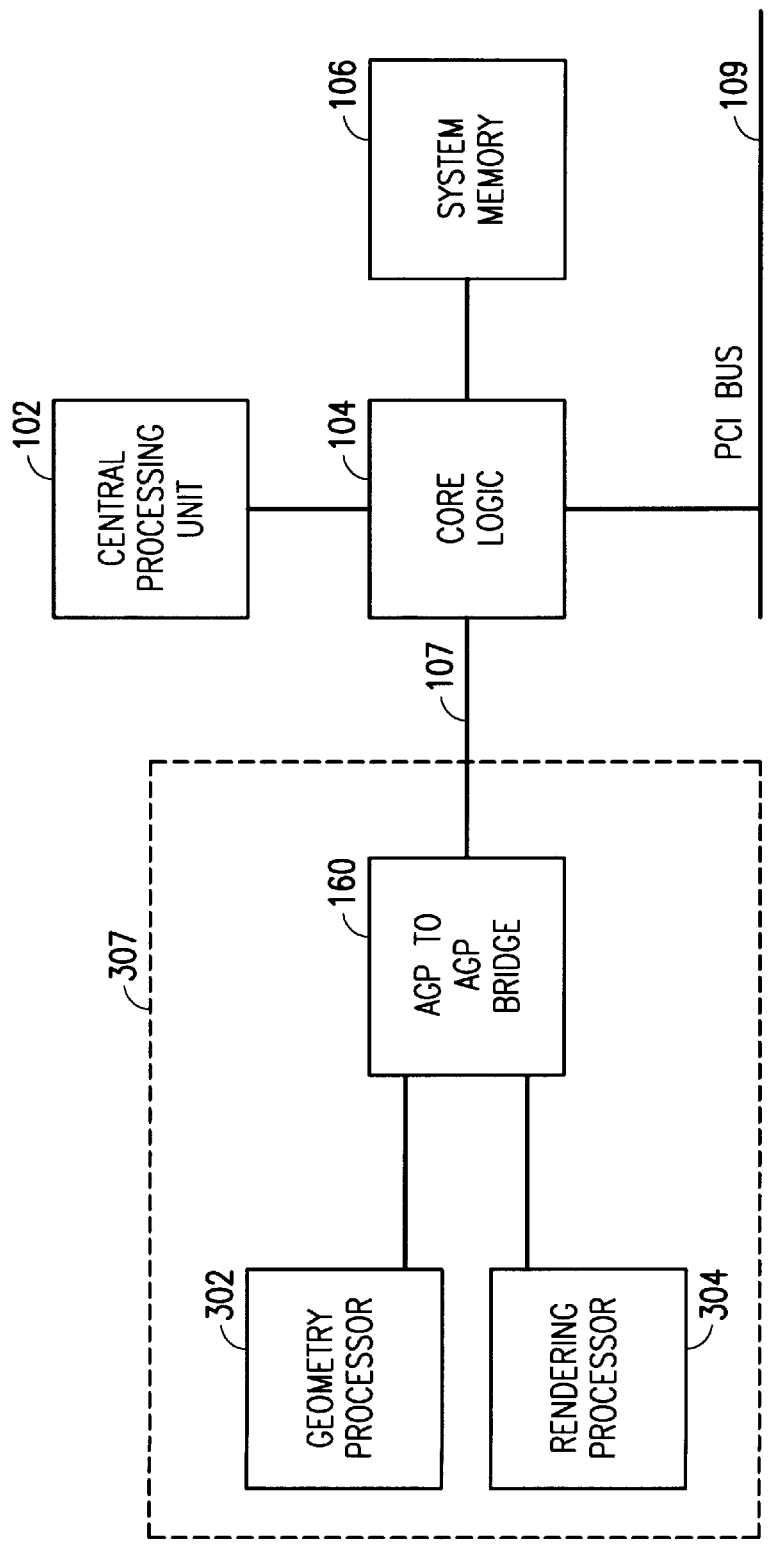
FIG. 4*c* is a block diagram of an alternate embodiment utilizing the AGP to AGP bridge of the present invention.

An alternate embodiment of the present invention is illustrated in FIG. 4*c*. In this embodiment, the AGP to AGP bridge 160, the geometry processor 302 and the rendering processor 304 all reside on a single printed circuit board (PCB) or PC card. This configuration enables a graphics intensive PC card to be built as a single unit and then plugged into the AGP bus 107.

Figure 4D:
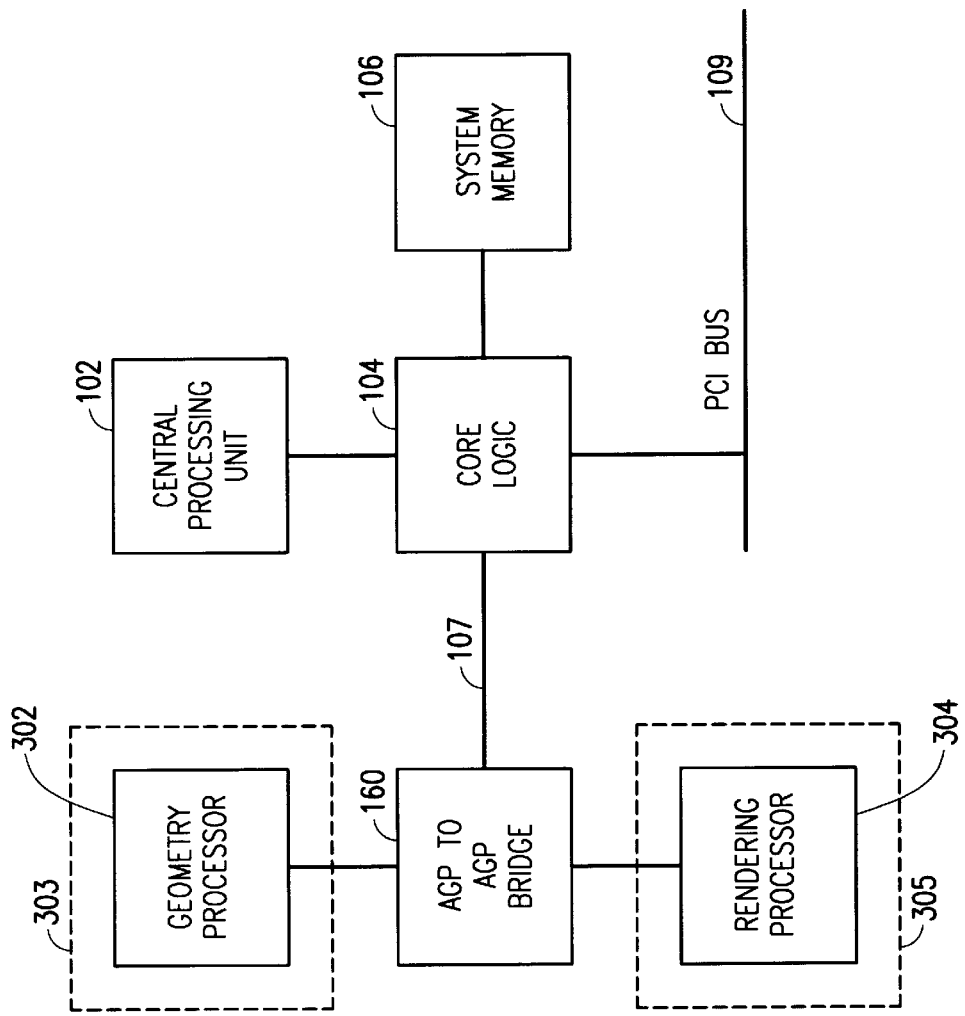
FIG. 4*d* is a block diagram of an alternate embodiment utilizing the AGP to AGP bridge of the present invention.

In yet another alternate embodiment of the present invention is illustrated in FIG. 4*d*. In this alternate embodiment, the AGP to AGP bridge 160 is connected to the AGP bus 107 in the normal fashion. However, unlike the embodiment shown in FIG. 4*c,* in this embodiment, the geometry processor 302 is embedded or resides on its own geometry processor board 303 which is a printed circuit board or PC card that is capable of accommodating a geometry processor board 303. Similarly, the rendering processor 304 is embedded on its own rendering processor board 305 as shown in FIG. 4d. As with the geometry processor board 303, the rendering processor board 305 is a printed circuit board or PC card that is capable of accommodating a rendering processor 304. This embodiment enables the geometry processor and the rendering processor to be upgraded or replaced separately, without affecting the rest of the computer system. In this alternate embodiment, the AGP to AGP bridge 160 does not reside on either the geometry processor board 303 or the rendering processor board 304. Instead, the AGP to AGP bridge 160 could reside on its own PCB or PC card, or it can be incorporated into the core logic chipset 104. This configuration, therefor, provides added flexibility.

Figure 4E:
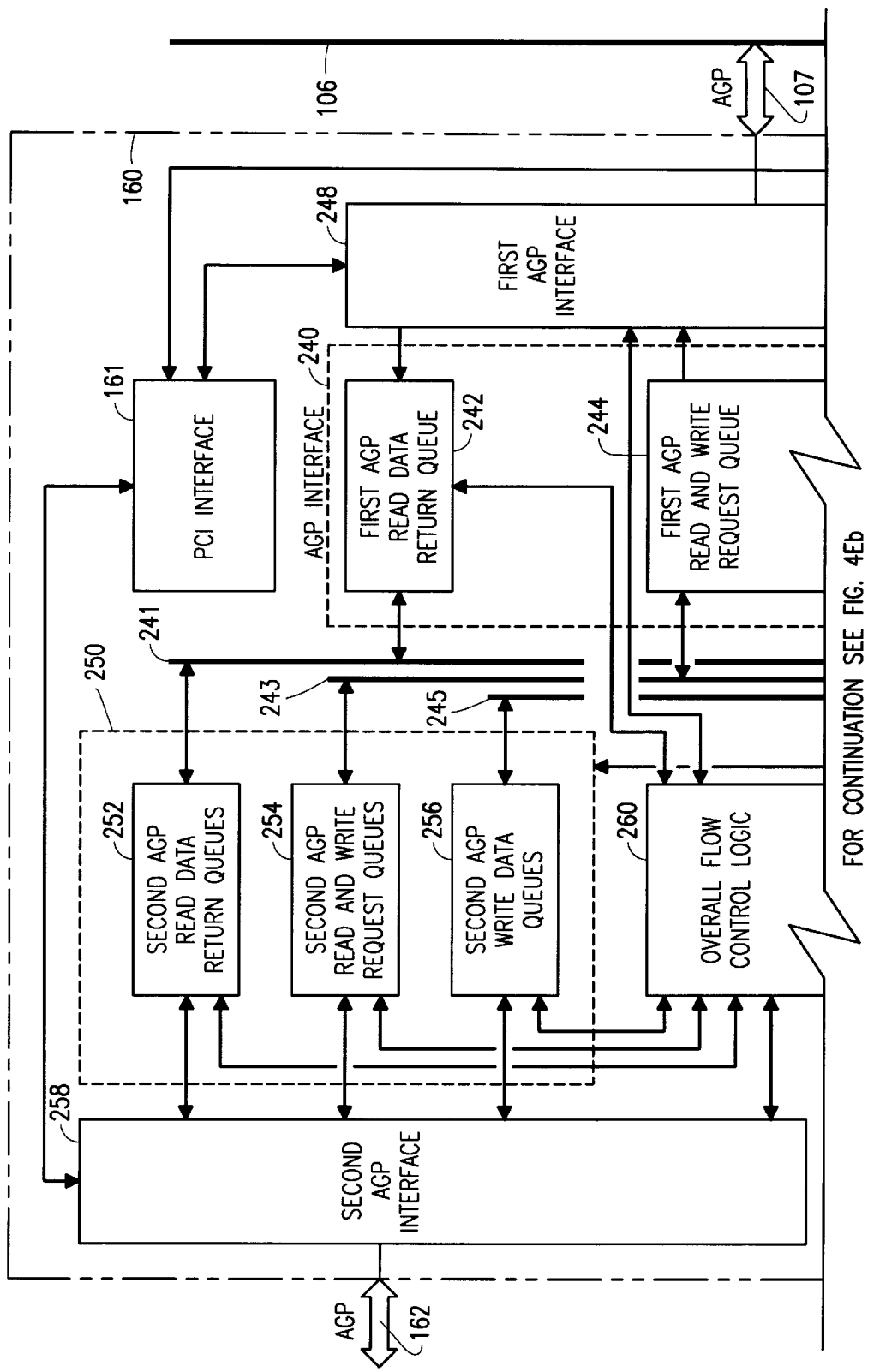
FIGS. 4E, 4E*b* is a block diagram of the preferred embodiment of the AGP to AGP bridge of the present invention.
Figure 4E:
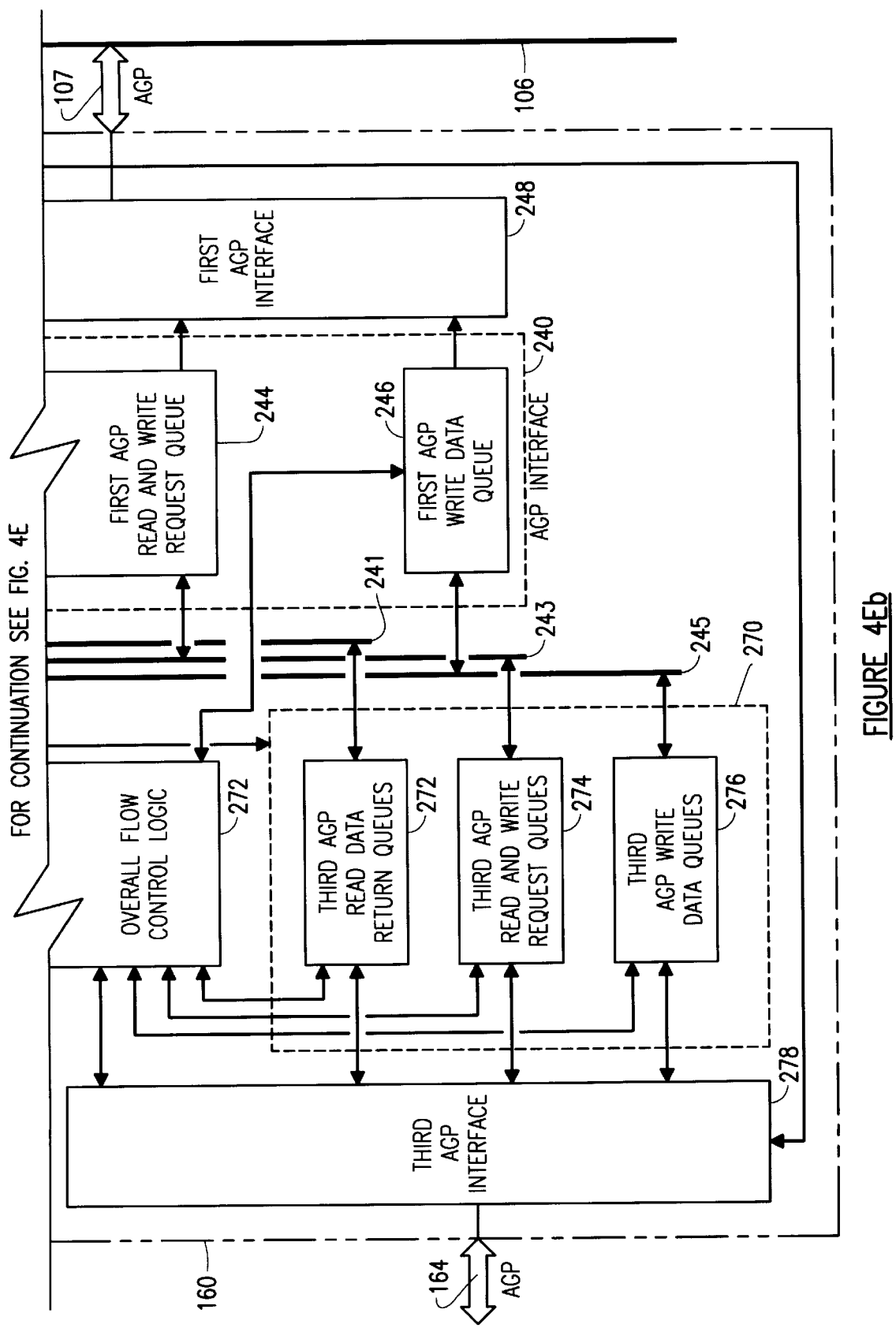

FIGS. 4E, 4Eb is a block diagram of the preferred embodiment of the AGP to AGP bridge of the present invention. The preferred embodiment AGP to AGP bridge 160 differs from the embodiment illustrated in FIG. 4a in that the preferred embodiment accommodates peer to peer transfer between the geometry processor 302 and the rendering processor 304 (of FIG. 4b). In order to accommodate peer-to-peer transfer, the second and third AGP interfaces have to be both a master and a target. However, according to the AGP specification, the device is always a master and the chipset is always a target. In the first embodiment of the AGP to AGP bridge 160 (see FIG. 4a), standard AGP interfaces are used. For example the second AGP interface 250 and the third AGP interface 270 were targets and the first AGP interface 240 was a master.

In the preferred embodiment, the AGP to AGP bridge 160 (shown in FIGS. 4E, 4Eb) is designed to enhance the support of peer-to-peer traffic. The queue blocks (252, 254, and 256) of the second AGP interface 250 are all bidirectional. Similarly, the queue blocks (272, 274 and 276) of the third AGP interface 270 are also bidirectional. Each bi-directional queue consists of two independent queues, one for each direction of traffic. For instance, there is a second AGP read and write request queue that contains requests from the second AGP bus 162 and is meant for the first AGP bus 107 or the third AGP bus 164. Similarly, there is another second AGP read and write request queue in the opposite direction which contains peer-to-peer requests from the third AGP bus 164 directed toward the second AGP bus 162. The bi-directionality between the first AGP interface 240, the second AGP interface 250, and the third AGP interface 270 can be facilitated by use of data buses 241, 243 and 245 as shown in FIG. 4e.

The overall flow control logic 260 of the preferred embodiment must be cognizant of the peer-to-peer address ranges supported by each AGP bus. The overall flow control logic 260 must be able to recognize from the address of the request whether or not it is a peer-to-peer or a bridge-to-host access. For example, when there is a request in the second AGP read and write request queue 254, the overall flow control logic 260 determines whether the request is a peer-to-peer transaction or a bridge-to-host access. If the request is a peer-to-peer transaction, then the request is sent to the third AGP read and write request queue 274 via bus 243. Otherwise, the request is sent to the first AGP read and write request queue 244. Likewise, when there is a request in the third AGP read and write request queue 274, the overall flow control logic 260 determines whether the request is a peer-to-peer transaction or a bridge-to-host access. If the request is a peer-to-peer transaction, the request is sent to the second AGP read and write request queue 254 via bus 243. Otherwise, the request is sent to the first AGP read and write request queue 244 via bus 243. This method is described in the flow diagram in FIGS. 17 and 18.

The flow of data is illustrated in FIGS. 17–20. The discussion of FIGS. 17–20 is found later in this specification. It should be noted however that the process of actually transferring the request from the second AGP queues to the third AGP queues, or vice versa, is similar to the transfer of request from the second AGP queue or the third AGP queue to the first AGP queue. If the request is a read request, then the read request is transferred to the other queue if there is space in that other queue. If the request is a write request, then the write request must be transferred and also the write data must also be transferred.

When there is a read request (originated from the third AGP bus) that needs to be run on the second AGP bus 162, the second AGP read and write request queue 254 is responsible for initiating the read transaction on the bus. Once the data has been returned to the second AGP read data return queue 252, the data is then transferred internally to the third AGP read data return queue 272. Likewise, when there is a read request (originated from the second AGP bus) that needs to be run on the third AGP bus, the third AGP read and write request queue is responsible to initiate the read transaction on the bus. Once the data has been returned to the third AGP read data return queue 272, the data is then transferred internally to the second AGP read data return queue 252. This flow is similar to a read request from the first AGP interface 240 and the transfer of the read reply to the second AGP interface 250 or to the third AGP interface 270 as illustrated in FIGS. 11, 14, 14A and 15.

Figure 11:
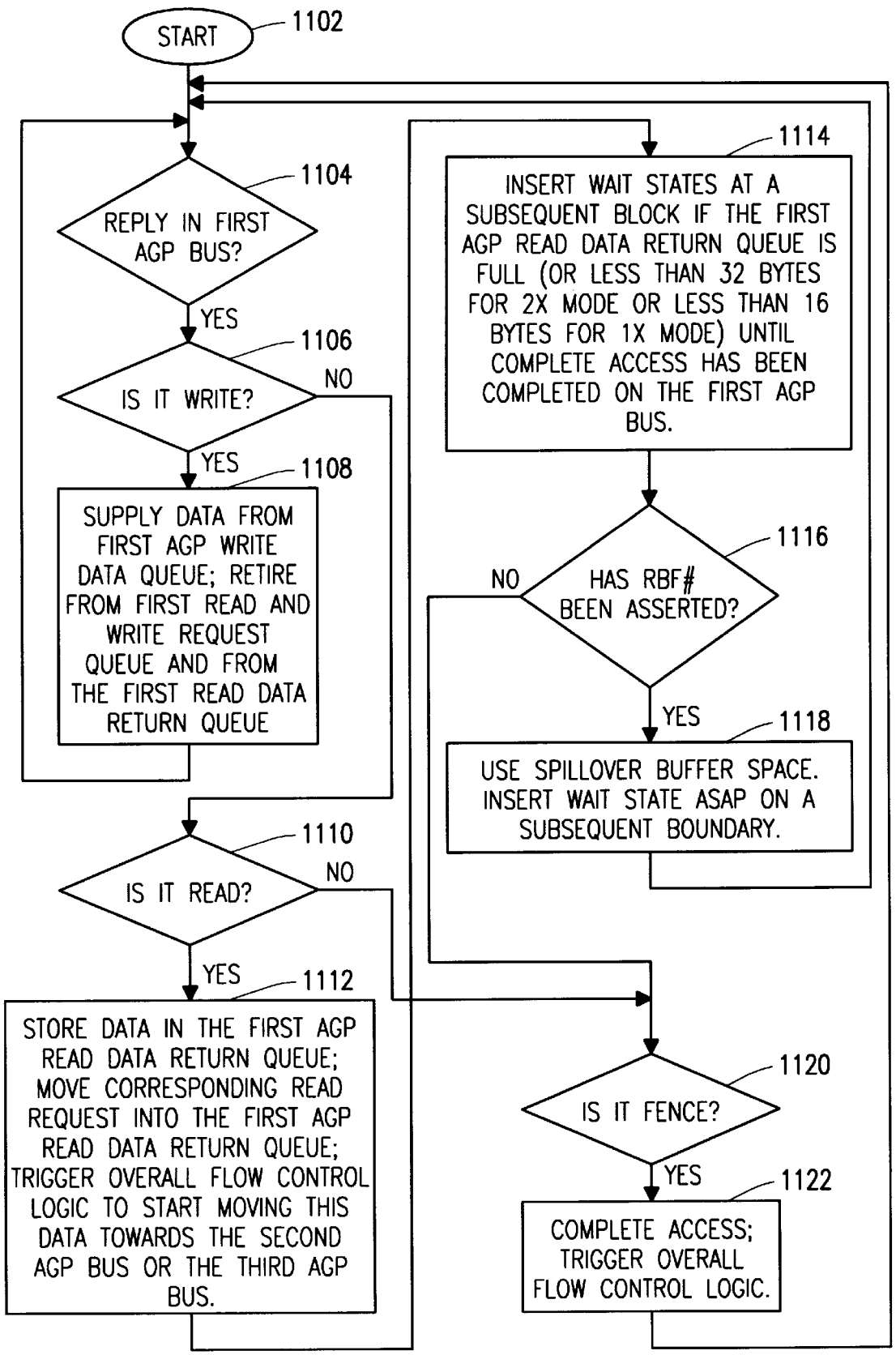
FIG. 11 is a flowchart of the function of the First AGP Bus Reply Interface of the present invention.

When there is a write request originating form the third AGP bus 164 that must be sent over the second AGP bus 162, the second AGP read and write request queue 254 is responsible for initiating the write transaction on the bus. The corresponding write data will be available in the second AGP write data queue 256. Likewise, when there is a write request originating form the second AGP bus 162 that must be sent over the third AGP bus 164, the third AGP read and write request queue 274 is responsible for initiating the write transaction on the bus. The corresponding write data will be available in the third AGP write data queue 276. This flow is similar to the completion of a write request from the first AGP interface 240 as illustrated in FIG. 11.

Figure 5:
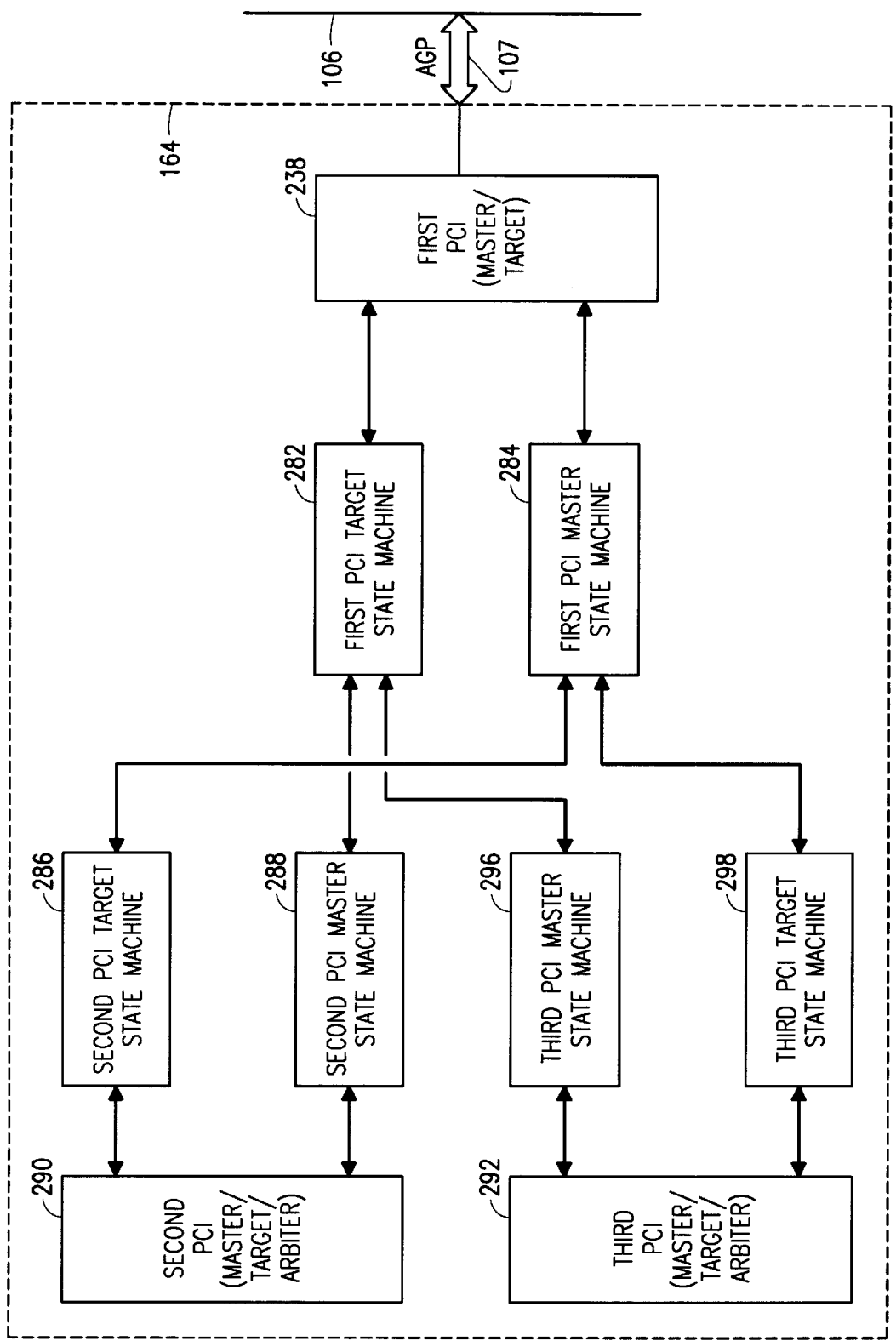
FIG. 5 is a block diagram of the PCI to PCI bridge of the present invention.

FIG. 5 shows the block diagram of the PCI interface 161 of the AGP to AGP bridge 160 of the present invention. The PCI interface 161 is connected to the AGP bus 107. The PCI interface 161 has a first PCI master/target interface 238 that connects the AGP bus 107 to a first PCI target state machine 282 and a first PCI master state machine 284. The first PCI target state machine 282 is connected to a second PCI master state machine 288 and a third PCI target state machine 296. The first PCI master state machine 284 is connected to a second PCI target state machine 286 and a third PCI target state machine 298 as shown in FIG. 5. The second PCI target state machine 286 and the second PCI master state machine 288, in turn, are connected to a second PCI master/target arbiter 290. Likewise, the third PCI target state machine 296 and the third PCI master state machine 298 are connected to the third PCI master/target arbiter 292.

Operation of the Second and Third Read and Write Request Queue

When the AGP device on either the second AGP bus 162 or the third AGP bus 164 needs to send a request to the AGP to AGP bridge 160, they will first assert the Request (REQ#)

line. When the corresponding queues (second read and write request queue 254 and third read and write request queue 274) have space to accept this request, the AGP to AGP bridge 160 will assert a Grant (GNT#) and the appropriate bits in the PCI status register (not shown). The AGP device will start transferring the request by asserting PIPE# or using the side-band addressing mentioned previously. The address, command, and length is stored in the second read and write request queue 254 and third read and write request queue 274. The AGP to AGP bridge 160 can do this simultaneously for both buses. When the master has completed transferring all the requests it has, the AGP to AGP bridge 160 will process the write commands. The master will need to get write data into the AGP to AGP bridge 160 so that, when the core logic 104 requests the data, the master will have the data available. The master will assert GNT# and set a status bit indicating a write request on the corresponding bus. The master will store the write data in the write data queues (either the second write data queue 256 or the third write data queue 276, depending upon whether the master is connected to the second AGP bus 162 or the third AGP bus 164, respectively).

The read and write request queues (244, 254, 274) will do all the ordering inside its queue block. Each read and write request queue will have a separate queue for high priority reads and writes in order to allow the queue to bypass the low priority requests. The read and write request queues (244, 254, 274) will also accommodate other ordering rules such as writes bypassing reads, fence and flush.

Operation of the Second and Third Write Data Queues

When the AGP to AGP bridge 160 executes a write cycle on the AGP buses, it stores the write data in the write data queues (246, 256, and 276). The write data will be stored in the same order in which it was received on the bus. However, it may not be practical to allocate space for the maximum allowable length of write accesses for the situation where all accesses in the queue are writes. Therefore, in the preferred embodiment of the present invention, write data queue space will be limited and the AGP to AGP bridge 160 can only run write cycles on the first AGP bus 107 when the AGP to AGP bridge 160 has space in the first write data queue 246 to accept the entire write data.

Operation of the First Read and Write Request Queue

In this scenario, the first AGP bus 107 is affected and the AGP to AGP bridge 160 is a master. The AGP to AGP bridge 160 has to wait for a GNT# from the core logic 104 (or, in an alternate embodiment of the present invention, other AGP bridges) before the AGP to AGP bridge 160 can start transferring requests to the core logic 104. The first read and write request queue 244 will accept requests from the second read and write request queue 254 and the third read and write request queue 274. The AGP interface 230 needs to follow all of the AGP ordering rules inside the first read and write request queue 244. In the preferred embodiment of the present invention, the first read and write request queue 244 will use some fair algorithm to service the second read and write request queue 254 and the third read and write request queue 274. Strict alternation is one option algorithm. However, it may be possible for the first read and write request queue 244 to treat all accesses inside of itself equally. What this means is that, the first read and write request queue 244 will allow all writes to bypass all reads regardless of whether the write came from the second AGP bus 162 or the third AGP bus 164. The first read and write request queue 244 will also block all future writes from bypassing reads if there is a fence access. This technique is non-optimal since accesses from the third AGP bus 164 do not care about ordering with accesses from second AGP bus 162. However, the implementation of this block will be simpler with this assumption. When requests are transferred from the second read and write request queue 254, and the third read and write request queue 274 to the first read and write request queue 244, the originating bus number has to be kept track of, in order to be able to return the data to the right bus.

Operation of the First Write Data Queue

When a write request is transferred from the second read and write request queue 254 or the third read and write request queue 274 to the first read and write request queue 244, the corresponding write data must be transferred from the second write data queue 256 or the third write data queue 276 to the first write data queue 246. If the write data is not available in the second write data queue 256 or the third write data queue 276 yet, then the write access should not be moved to the first write data queue 246. This might stall other accesses from proceeding through them even if they might have been capable of doing so. However, under this methodology, when the access is run on the first AGP bus 107 and the core logic 104 needs the write data, the computer system will not have to stall the operation with excessive wait states which would be detrimental to performance.

Operation of the First Read Data Return Queue

When the core logic 104 responds to a read request, the data is kept in the first read data return queue 242. From there, the data is matched up with the originating request. The data is transferred to the corresponding second read data return queue 252 or the third read data return queue 272. Then the request can be retired from the first read and write request queue 244.

Operation of the Second and the Third Data Return Queues

When there is read data in either the second read data return queue 252 or the third read data return queue 272, the AGP to AGP bridge 160 asserts GNT# at the first opportunity, and then starts to transfer data to the AGP device that issued the read request. The random data that is returned on a fence operation is also returned through the second read data return queue 252 or the third read data return queue 272.

Operation of the Overall Flow Control Logic

The flow control logic 260 is responsible for control of data between all the other blocks in the AGP to AGP bridge 160. Requests can be transferred from the second read and write request queue 254 and the third read and write request queue 274 to the first read and write request queue 244 only when there is space in the queue in the first read and write request queue 244. The second AGP interface 250 and the third AGP interface 270 can accept requests from the second AGP bus 162 and the third AGP bus 164, respectively, only when there is space in the second read and write request queue 254 and the third read and write request queue 274, respectively. The flow control logic 260 generally controls the flow from the second AGP interface 250 and the third AGP interface 270 into the first AGP interface 240. The flow control logic 260 also controls the flow of data back from the first AGP interface 240 to the second AGP interface 250 and the third AGP interface 270. The flow control logic 260 also controls the flow between the AGP to AGP bridge 160 and the AGP interfaces (240, 250 and 270) on their respective AGP buses (107, 162 and 164).

The request operation of the second interface target and arbiter 258 is illustrated in FIG. 6. The operation is started in step 602. First, a check is made if there is a request on the second AGP bus 162, step 604. If no request is present, step 604 is repeated until the result is positive (i.e., YES). If a request is present on the second AGP bus 162, then the request is added to the second read and write request queue 254, step 606. Finally, in step 608, the requests are reordered according to the appropriate ordering rules. In the preferred embodiment of the present invention, the ordering rules are a predefined set of ordering rules. However, it is within the scope of the present invention to utilize a dynamically created set of ordering rules based upon conditions at that instant time.

The reply operation of the second interface target and arbiter 258 is illustrated in FIG. 7. The operation is started in step 702. First, a control signal to start a transaction is received from the flow control logic 260, step 704. Next, in step 706, three sub-steps take place. First, an arbitration is performed and a read reply transaction is started. Second, data is retrieved from the read data return queue 256. Third, wait states are inserted, if necessary, when instructed by the flow control logic 260.

Figure 8:
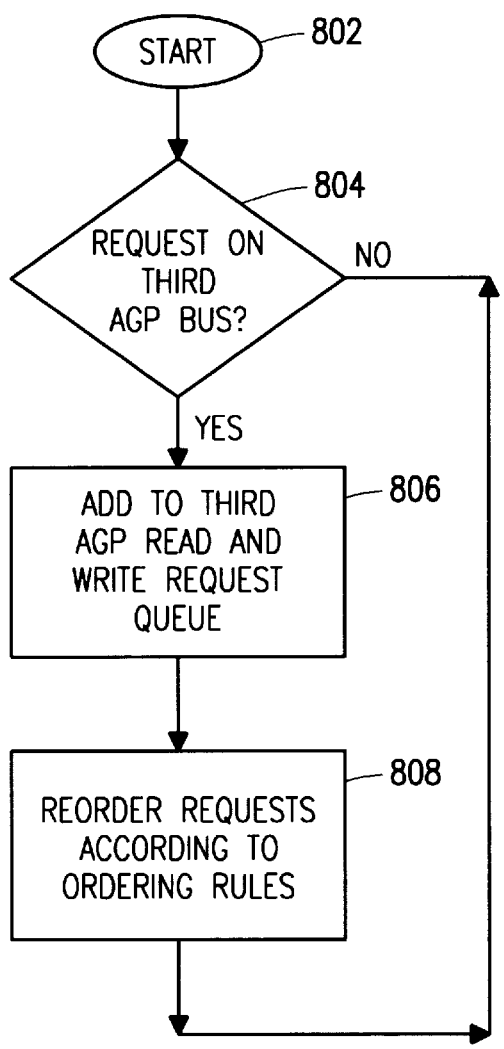
FIG. 8 is a flowchart of the function of the Third AGP Bus Request Interface of the present invention.

The request operation of the third interface target and arbiter 278 is illustrated in FIG. 8. The operation is started in step 802. First, a check is made if there is a request on the third AGP bus 164, step 804. If no request is present, step 804 is repeated until the result is positive (i.e., YES). If a request is present on the third AGP bus 164, then the request is added to the third read data return queue 272, step 806. Finally, in step 808, the requests are reordered according to the appropriate ordering rules. In the preferred embodiment of the present invention, the ordering rules are a predefined set of ordering rules. However, it is within the scope of the present invention to utilize a dynamically created set of ordering rules based upon condition at that instant of time.

Figure 9:
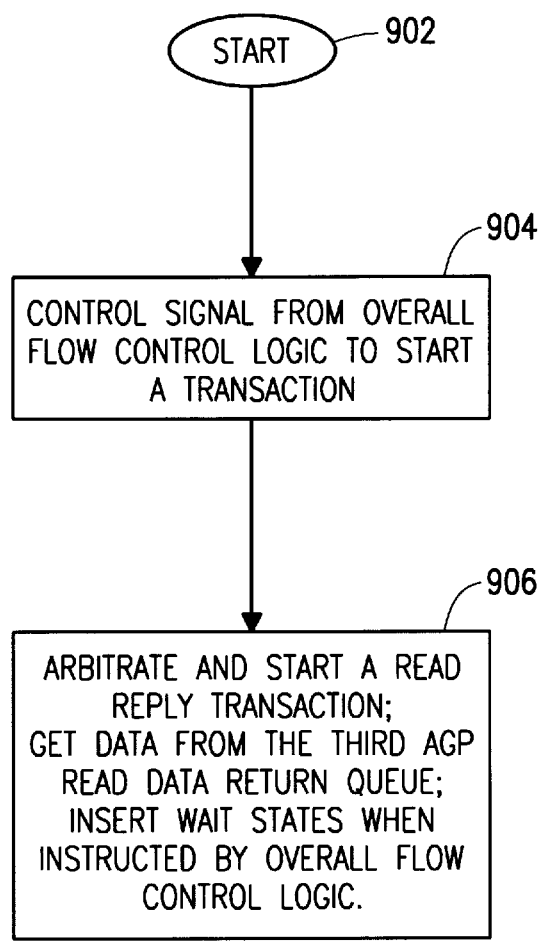
FIG. 9 is a flowchart of the function of the Third AGP Bus Reply Interface of the present invention.

The reply operation of the third interface target and arbiter 278 is illustrated in FIG. 9. The operation is started in step 902. First, a control signal to start a transaction is received from the flow control logic 260, step 904. Next, in step 906, three sub-steps take place. First, an arbitration is performed and a read reply transaction is started. Second, data is retrieved from the third read and write request queue 274. Third, wait states are inserted, if necessary, when instructed by the flow control logic 260.

Figure 10:
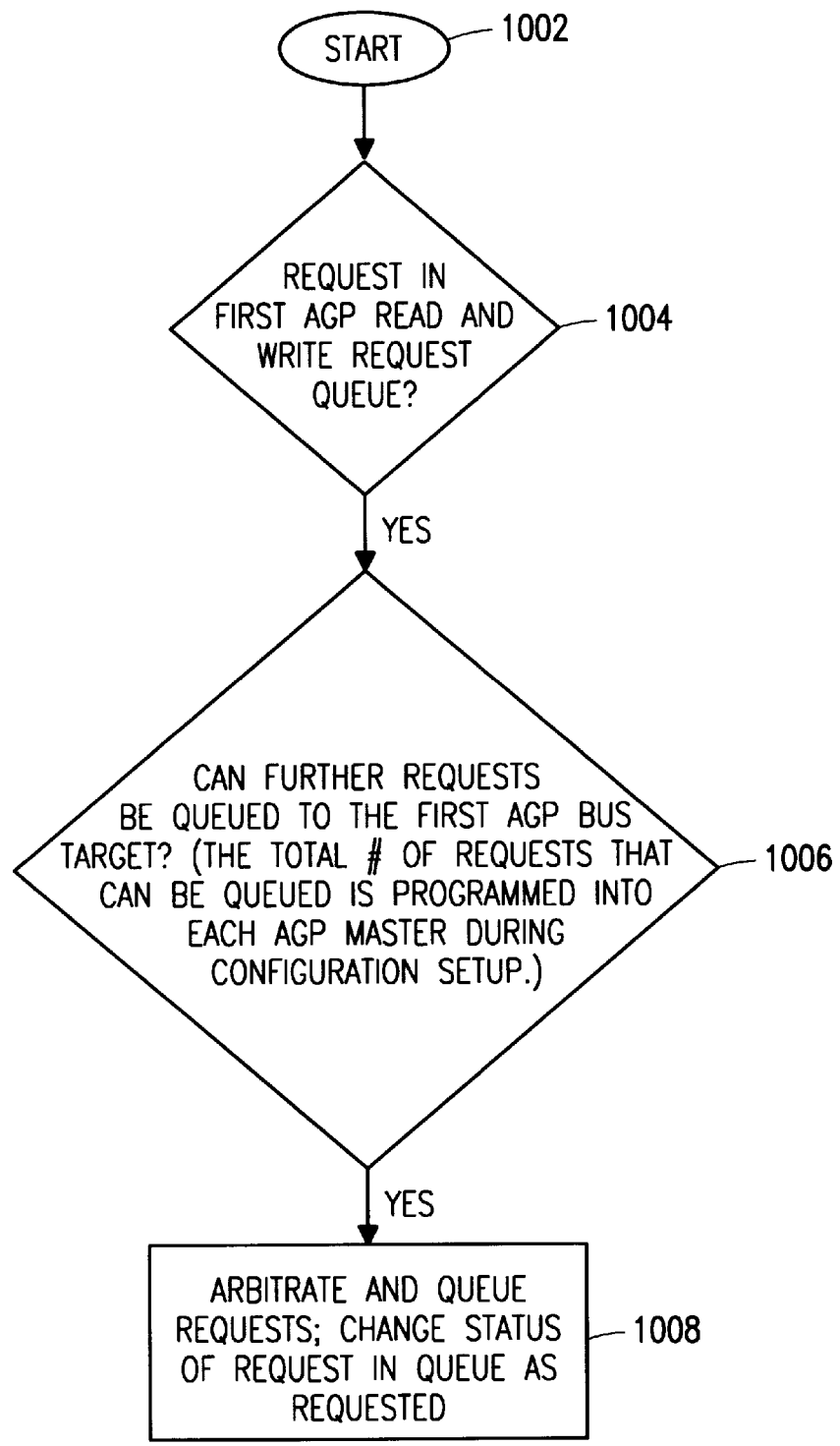
FIG. 10 is a flowchart of the function of the First AGP Bus Request Interface of the present invention.

The request operation of the first AGP bus 107 is illustrated in FIG. 10. The operation is started in step 1002. First, in step 1004, a check is made to determine if a request is in the first read and write request queue 244. If a request is present, (i.e., the result is YES), then step 1006 is undertaken. In step 1006, a check is made to determine if additional request can be queued to the first interface target and arbiter 248. It should be noted that the total number of requests that can be queued at any one time is programmed into each AGP master during the configuration setup. If further requests can be queued, then step 1008 is performed. During step 1008, an arbitration is performed and the requests are queued. In addition, in step 1008, the status of the request in the queue is changed if so requested.

The reply operation of the first AGP bus 107 is shown in FIG. 11. The operation is started in step 1102. First, a check is made to determine if there is a reply in the first AGP bus 107, step 1104. If so, then step 1106 is performed where a check is made to determine if the reply is a write statement. If so, step 1108 is performed, otherwise, execution jumps to step 1110. In step 1108, data is supplied from the first write data queue 246. The data is then retired from the first read and write request queue 244 and the first read data return queue 242. In step 1110, a check is made to determine if the reply is a read statement. If so, execution continues onto step 1112, otherwise, execution jumps to step 1120. In step 1112, the data is stored in the first read data return queue 242 and the corresponding read request is moved to the first read data return queue 242. Further, in step 1112, the flow control logic 260 is triggered to start moving this data towards either the second AGP bus 162 or the third AGP bus 164. Next, in step 1114, wait states at a subsequent block are inserted if the first read data return queue 242 is full or is less than 32 bytes while in 2× mode or 16 bytes while in 1× mode until access has been completed on the first AGP bus 107. Thereafter, in step 1116, a check is made to see if an RBF# has been asserted. If so, then step 1118 is executed wherein the buffer space that was reserved for RBF# spillover is utilized and an ASAP wait state is inserted on a subsequent boundary per the AGP specification. If not, execution skips to step 1120. In step 1120, a check is made to determine if the reply is a fence. If so, then, in step 1122, the access is completed and the flow control logic 260 is triggered accordingly.

Figure 12:
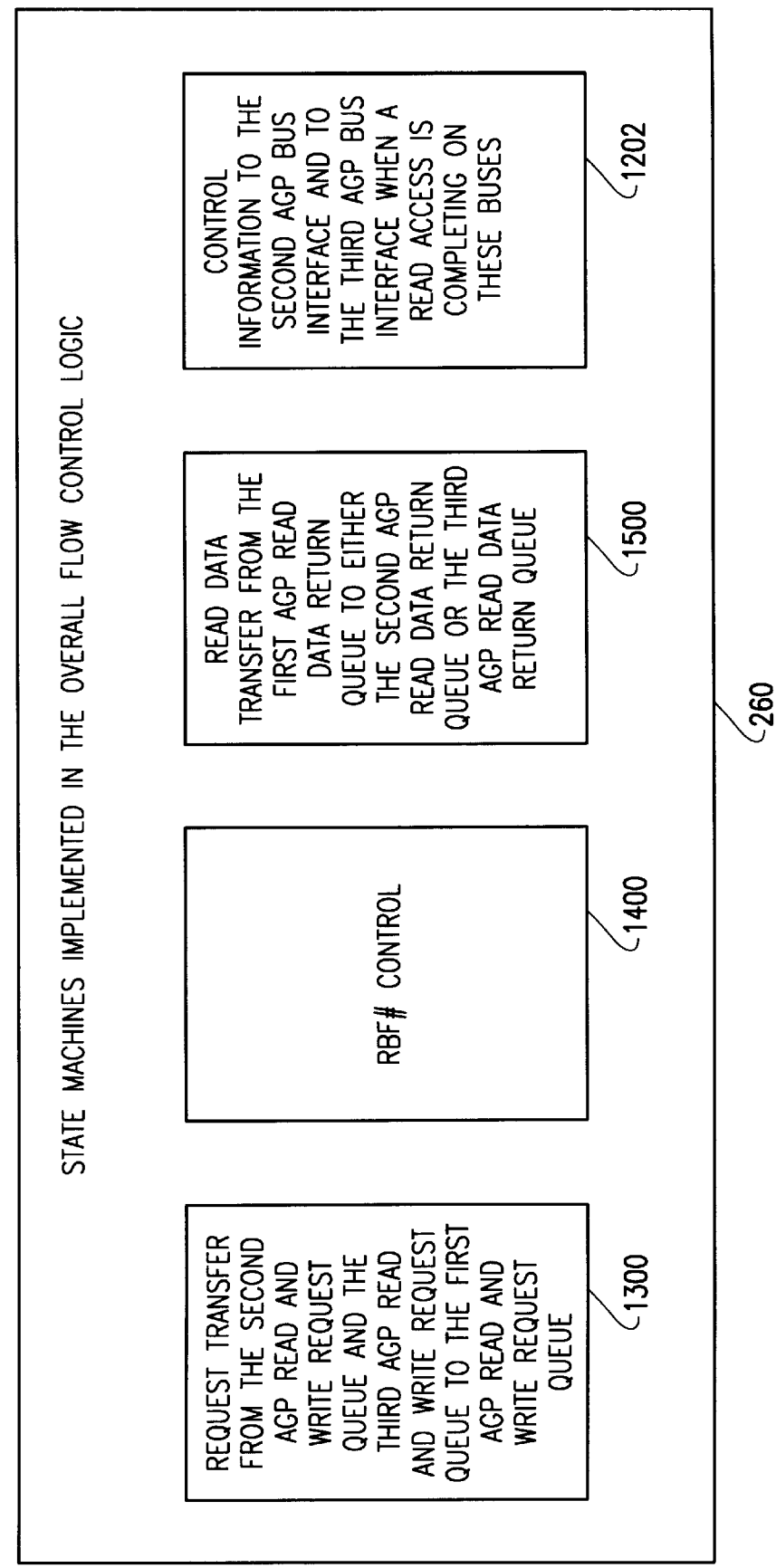
FIG. 12 is a block diagram showing the state machines within the Control Flow Logic of the present invention.

FIG. 12 illustrates the four major state machines implemented within the flow control logic 260. The flow control logic 260 has several parallel and somewhat independent functions. Each of these functions will be described and illustrated below.

Referring again to FIG. 12, the first state machine 1300 requests a transfer from either the second read and write request queue 254 or the third read and write request queue 274 to the first read and write request queue 244. The second state machine 1400 is the control for the RBF#. The third state machine 1500 is for read data transfers from the first read data return queue 242 to either the second read data return queue 252 or the third read data return queue 272. The fourth state machine 1202 controls the information to the second interface target and arbiter 258 and the third interface target and arbiter 278 when a read access is completing on either of those buses, respectively.

Figure 13:
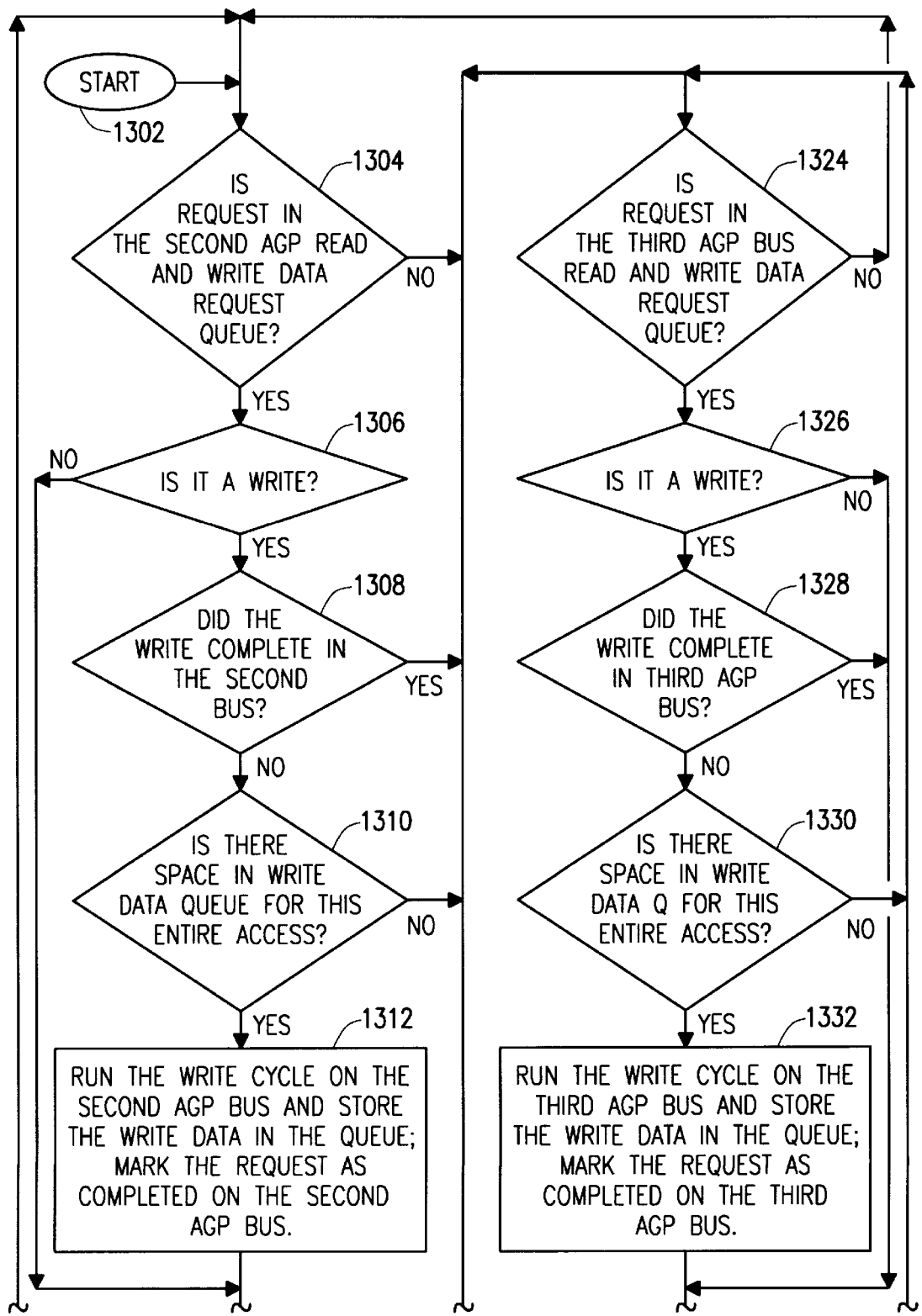
FIGS. 13, 13A is a flowchart for the first state machine within the Flow Control Logic of the present invention.
Figure 13A:
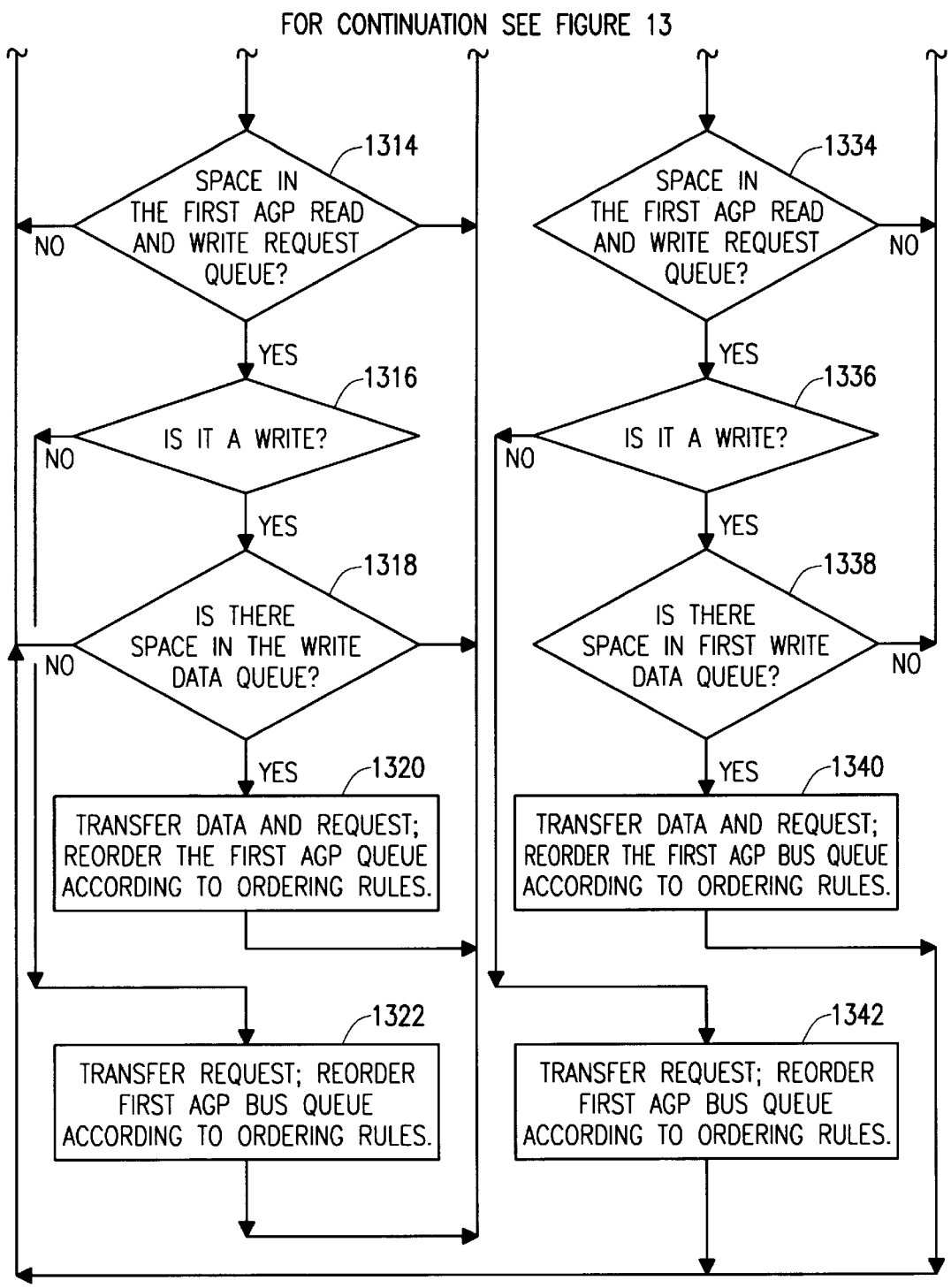

The function of the first state machine 1300 is shown in FIGS. 13, 13A. The operation is started in step 1302. First, a check is made to determine if the requested transfer is in the second read and write request queue 254. If not, execution is jumped to step 1324 to perform the same check with regard to the third read and write request queue 274. If the requested transfer is in the second read and write request queue 254, then execution continues to step 1306 where a check is made to determine if the requested transfer is a write. If not, then execution jumps to step 1314, otherwise, execution continues to step 1308. In step 1308, a check is made to determine if the write was complete in the second AGP bus 162. If so, then execution jumps to step 1324, otherwise, execution continues on to step 1310 where another check is made to determine if there is space in the first write data queue 246 for the entire access. If not, then execution jumps to step 1324, otherwise, execution continues to step 1312 wherein the write cycle is executed on the second AGP bus 162 and the write data is stored in the first write data queue 246. The request is then marked as completed on the second AGP bus 162 to complete step 1312.

In step 1314, a check is made to determine if space is available in the first read and write request queue 244 of the first AGP bus 107. If not, execution is looped back to step 1304, otherwise, execution continues onto step 1316. In step 1316, a check is made to determine if the request is a write. If not, execution is jumped to step 1322, otherwise, execution continues on to step 1318 where a check is made to determine if there is space in the first write data queue 246. If not, then execution is looped back to step 1304, otherwise, execution continues on to step 1320 wherein the data and request are transferred and the first AGP queues are reordered according to the appropriate ordering rules. Execution then jumps to step 1324. In step 1322, to which execution jumps if the request is not a write, the request is transferred and the first AGP bus 107 queue is reordered according to the appropriate ordering rules.

Steps 1324 through 1342 are similar to steps 1304 through 1322 only that, in this case, the AGP bus affected is the third AGP bus 164 instead of the second AGP bus 162. There are some minor differences, however.

In step 1324, a check is made to determine if the request is in the third read and write request queue 274. If not, execution is looped back to the start at step 1304, otherwise, execution continues to step 1326. In step 1326, a check is made to determine if the request is a write statement. If not, execution is jumped to step 1334, otherwise, execution continues on to step 1328 where a check is made to determine if the write was complete in the third AGP bus 164. If so, then execution is jumped to step 1334, otherwise, execution continues on to step 1330 where a check is made to determine if space is available in the first write data queue 246 for the entire access. If not, execution is looped back to step 1324, otherwise, execution continues on to step 1332 where the write cycle is executed on the third AGP bus 164 and the write data is stored in the first write data queue 246. The request is then marked as completed on the third AGP bus 164 to complete step 1332.

In step 1334, a check is made to determine if space is available in the first read and write request queue 244. If not, execution is looped back to step 1324, otherwise, execution continues on to step 1336 where a check is made to determine if the request is a write. If not, execution is jumped to step 1342, otherwise, execution continues on to step 1338 where a check is made to determine if space is available on the first write data queue 246. If not, execution is looped back to step 1324, otherwise, execution continues on to step 1340 where the data and the request is transferred to the appropriate queues of the first AGP bus 107 and those queues are reordered according to the ordering rules. Execution is then looped back to the start at step 1304. If the request is a not write, then, as mentioned before, step 1342 is executed wherein the request is transferred to the appropriate queue in the first AGP bus 107 and those queues are reordered according to the appropriate ordering rules.

Figure 14:
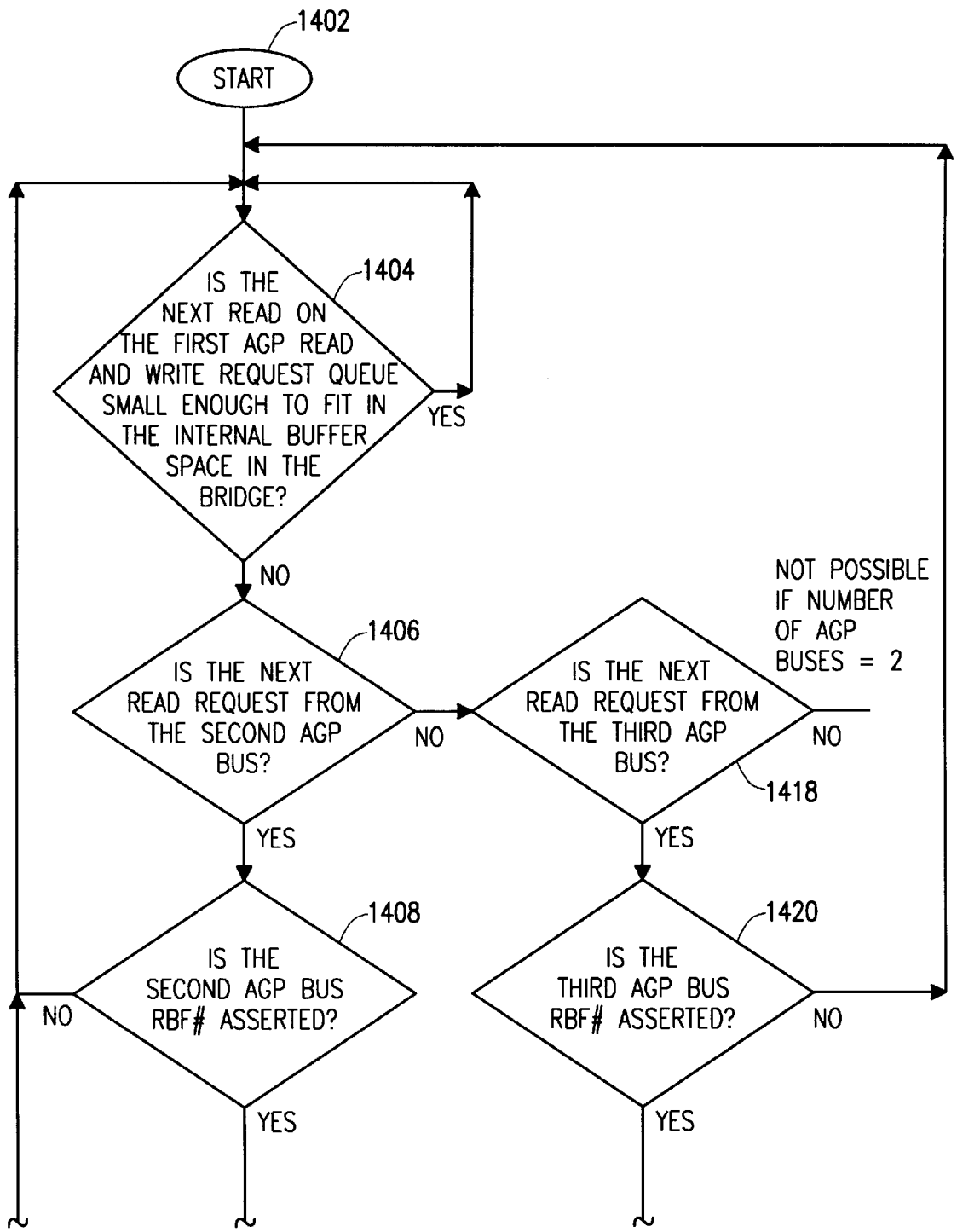
FIGS. 14, 14A is a flowchart for the second state machine within the Flow Control Logic of the present invention.
Figure 14A:
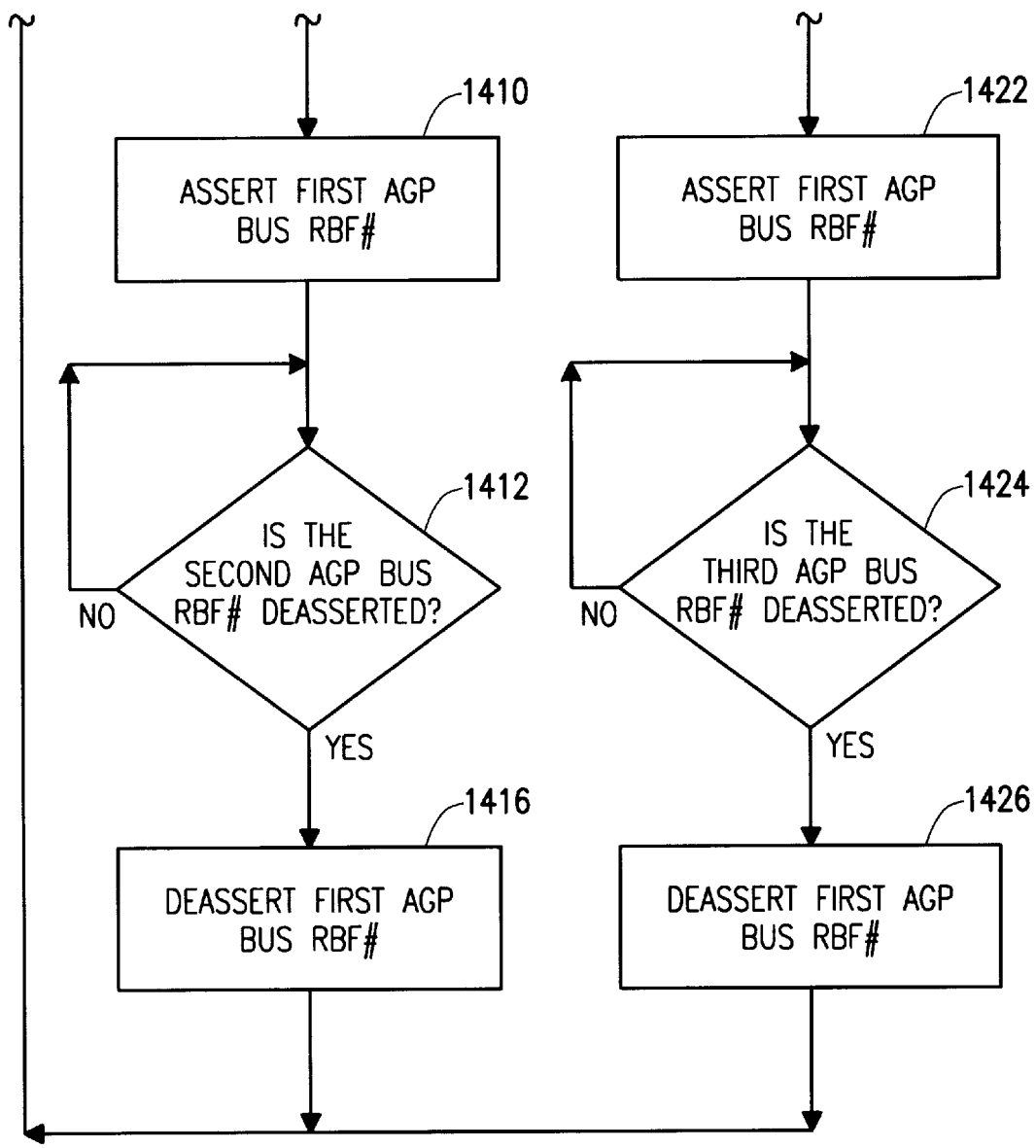

The function of the second state machine 1400 is illustrated in FIGS. 14, 14A. Referring now to FIG. 14, the operation of the RBF# control is accomplished in the following steps. The process is started in step 1402. First, in step 1404, a check is made to determine if the next read on the first read and write request queue 244 is small enough to fit within the internal buffer space in the AGP to AGP bridge 160. If so, then execution is looped back to step 1404, otherwise, execution continues on to step 1406 where a check is made to determine if the next read request is from the second AGP bus 162. If not, execution is jumped to step 1418 where the same check is made for the third AGP bus 164. Otherwise, execution continues on to step 1408 where a check is made to determine if the RBF# on the second AGP bus 162 has been asserted. If not, then execution is looped back to step 1404. Otherwise, execution continues on to step 1410 where the RBF# for the first AGP bus 107 is asserted. Next, in step 1412, a check is made to determine if the RBF# of the second AGP bus 162 has been de-asserted. If not, then step 1412 is repeated. If so, then execution continues on to step 1416 wherein the RBF# for the first AGP bus 107 is de-asserted. Execution is then looped back to step 1404.

If the next read request was not from the second AGP bus 162, then it must have come from the third AGP bus 164. In that case, step 1418 is performed and, upon testing positive, a check is made to determine if the RBF# of the third AGP bus 164 has been asserted, step 1420. If not, execution is looped back to step 1404, otherwise, execution continues to step 1422 where the RBF# for the first AGP bus 107 is asserted. Next, in step 1424, a check is made to determine if the RBF# of the third AGP bus 164 has been de-asserted. If not, step 1424 is repeated. Otherwise, in step 1426, the RBF# of the first AGP bus 107 is de-asserted and execution is looped back to step 1404.

Figure 15:
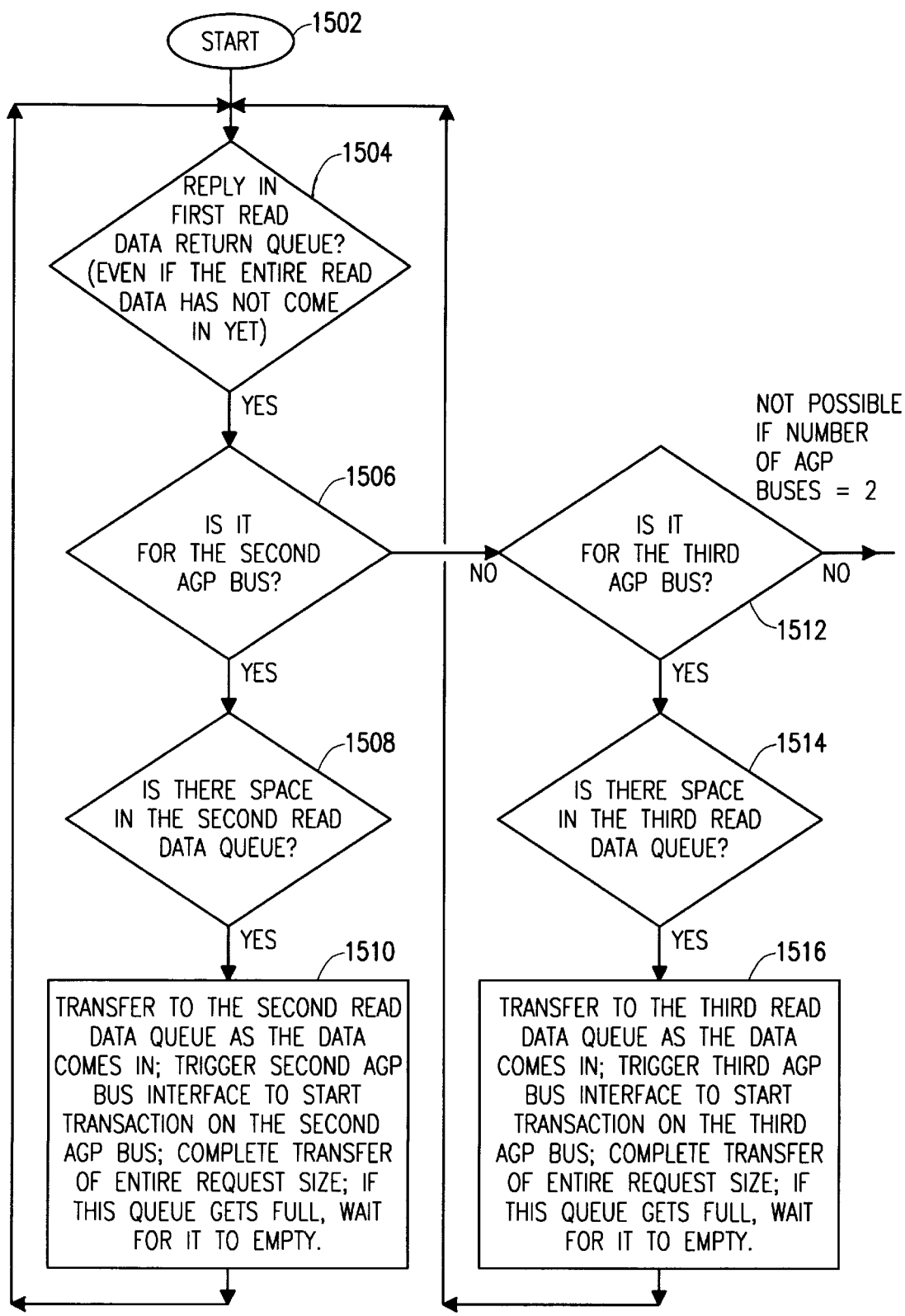
FIG. 15 is a flowchart for the third state machine within the Flow Control Logic of the present invention.

The function of the third state machine 1500 is illustrated in FIG. 15. FIG. 15 shows a flow diagram of a read data transfer from the second AGP bus 162 or the third AGP bus 164 to the first AGP bus 107. The process starts in step 1502. Next, in step 1504, a check is made to determine if there is a reply in the first read data return queue 242 (even if the entire read data has not yet arrived). If so, then execution proceeds to step 1506 where a check is made to determine if the reply is for the second AGP bus 162. If not, execution shifts to step 1512 in order to handle a transfer from the third AGP bus 164. Otherwise, execution proceeds to step 1508 where a check is made to determine if there is sufficient space in the second read data return queue 252. If so, execution proceeds to step 1510 where the data is transferred (as it comes in) to the second read data return queue 252. Also in step 1510, the second interface target and arbiter 258 is triggered to start a transaction on the second AGP bus 162 and to complete the transfer of the entire requested size and, if the second read data return queue 252 becomes full, to wait for it to empty.

If the reply is not for the second AGP bus 162, then it must be for the third AGP bus 164, prompting step 1512 to be executed. In step 1512, a check is made to verify that the reply is for the third AGP bus 164. If so, then step 1514 is executed wherein a check is made to determine if there is sufficient space available in the third read data return queue 272. If so, then execution proceeds to step 1516, where the data is transferred (as it comes in) to the third read data return queue 272. Also in step 1516, the third interface target and arbiter 278 is triggered to start a transaction on the third AGP bus 164 and to complete the transfer of the entire requested size and, if the third read data return queue 272 becomes full, to wait for it to empty.

Handling Peer-to-Peer Transactions

Figure 17:
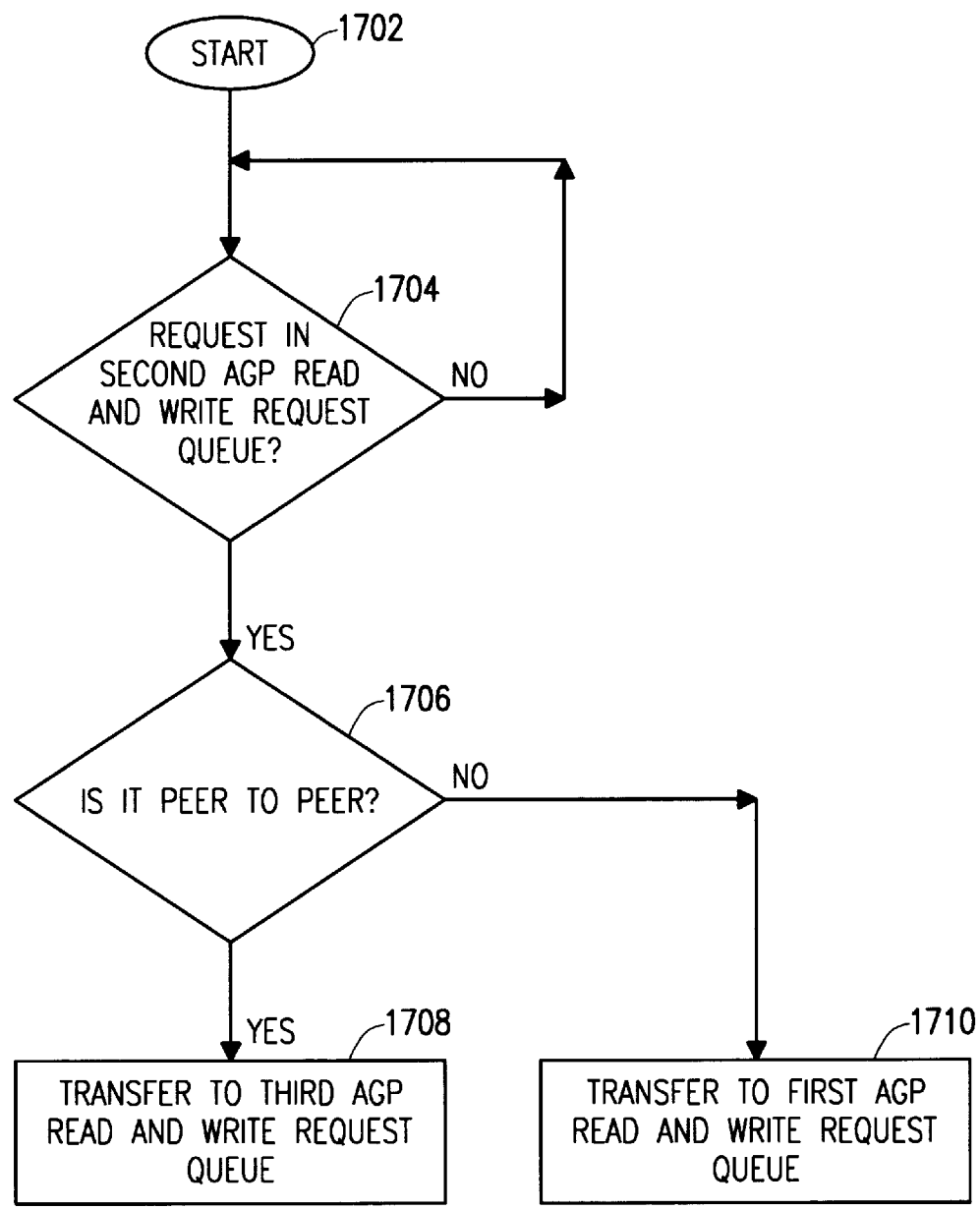
FIG. 17 is a flowchart for peer-to-peer enabled requests of the second AGP read and write request queue.

If the AGP to AGP bridge 160 is to handle peer-to-peer transactions, several additional steps of the method of the present invention must be taken. For example, FIG. 17 illustrates the steps needed if there is a request in the second AGP read and write request queue 254 (see FIG. 4e). First, the peer-to-peer enabled processing starts in step 1702. Next, in step 1704, a check is made to determine if there is a request in the second AGP read and write request queue 254. If no request is present (i.e., the result of step 1704 is "No"), then step 1704 is repeated until a request is present. If a request is present, then a check is made to determine if the request is a peer-to-peer request, step 1706. If the request is a peer-to-peer request (i.e., the result of step 1706 is "Yes"), then the request is transferred to the third AGP read and write request queue 274 of FIG. 4e in step 1708. If the request is not a peer-to-peer request (i.e., the result of step 1706 is "No"), then the request is transferred to the first AGP read and write request queue 244 in step 1710.

Figure 18:
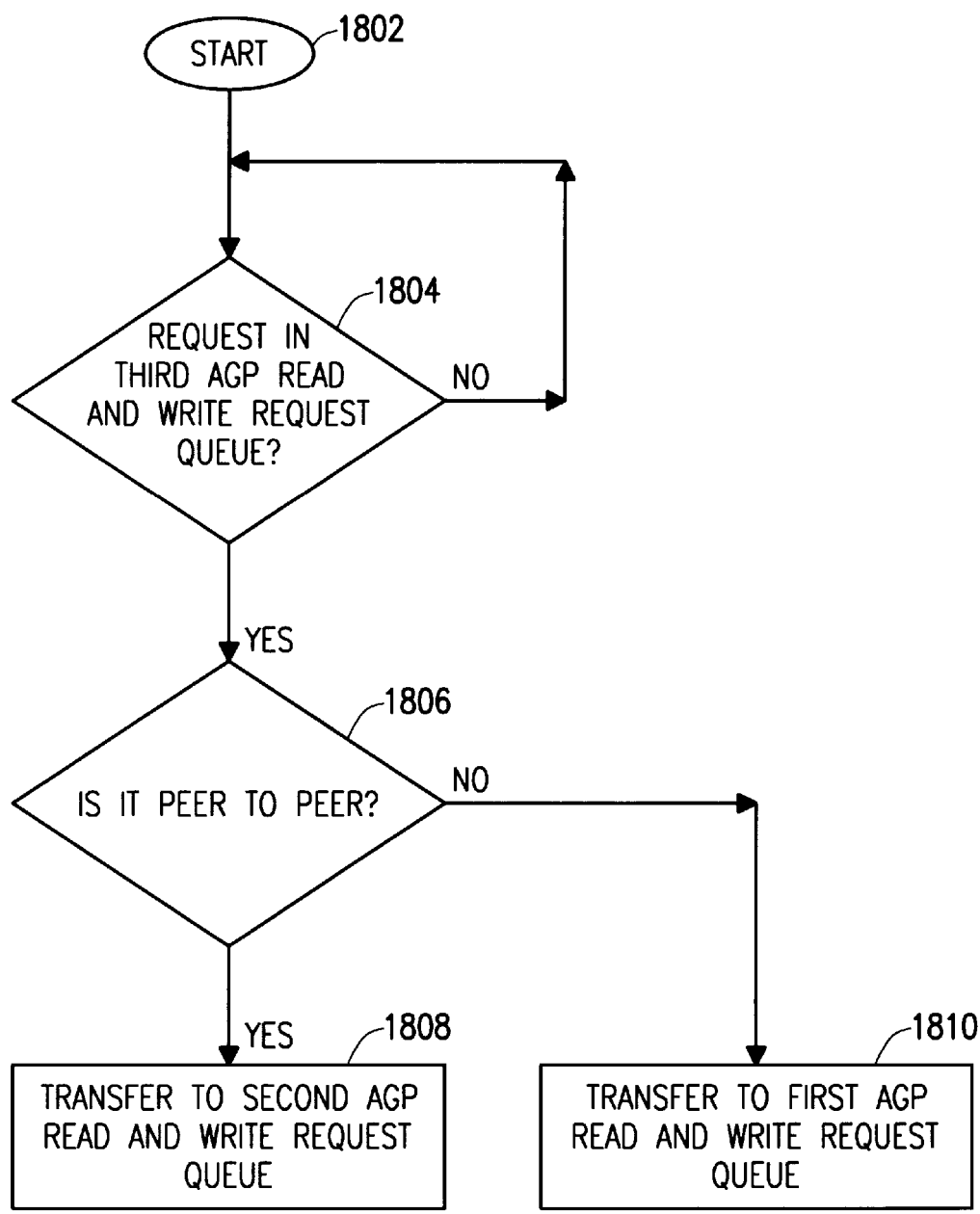
FIG. 18 is a flowchart for peer-to-peer enabled requests of the third AGP read and write request queue.

The situation of a request in the third AGP interface 270 is similar to that of the second AGP interface 250. For example, FIG. 18 illustrates the steps needed if there is a request in the second AGP read and write request queue 274 (see FIG. 4e). First, the peer-to-peer enabled processing starts in step 1802. Next, in step 1804, a check is made to determine if there is a request in the third AGP read and write request queue 274. If no request is present (i.e., the result of step 1804 is "No"), then step 1804 is repeated until a request is present. If a request is present, then a check is made to determine if the request is a peer-to-peer request, step 1806. If the request is a peer-to-peer request (i.e., the result of step 1806 is "Yes"), then the request is transferred to the second AGP read and write request queue 254 of FIG. 4e in step 1808. If the request is not a peer-to-peer request (i.e., the result of step 1806 is "No"), then the request is transferred to the first AGP read and write request queue 244 in step 1810.

Figures 19, 20:
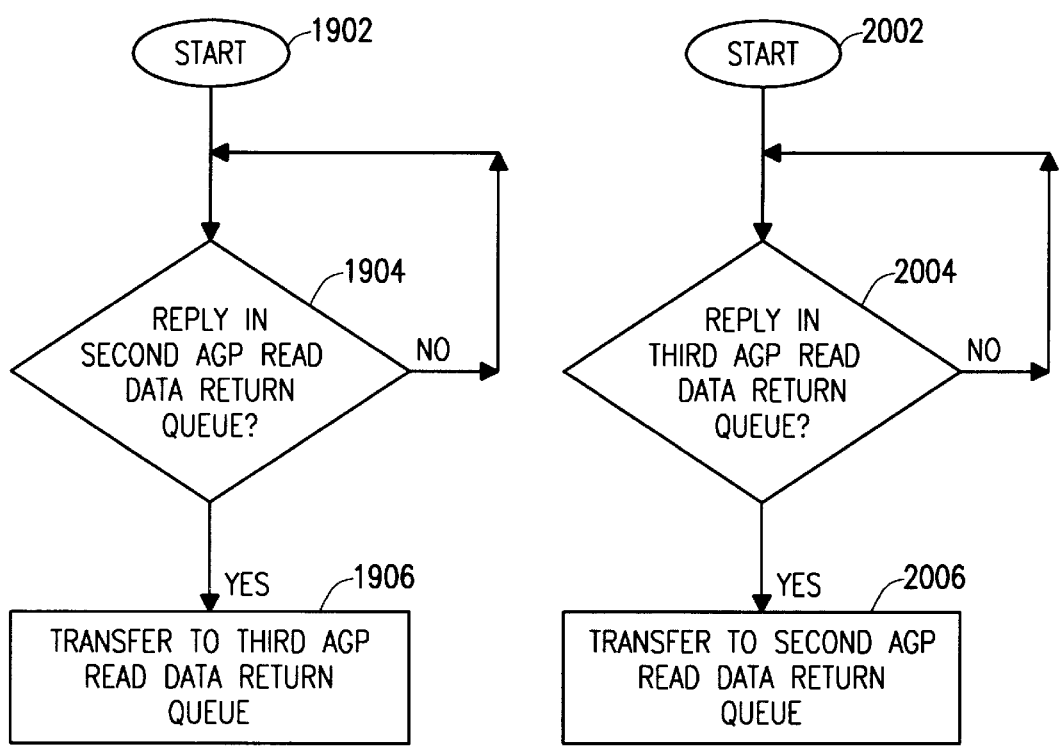
FIG. 19 is a flowchart for peer-to-peer replies in the second AGP read and write request queue.
FIG. 20 is a flowchart for peer-to-peer replies in the third AGP read and write request queue.

In the case of peer-to-peer enabled embodiments AGP to AGP bridge 160 of the present invention, replies are handled expeditiously. Recall that in the peer-to-peer enabled embodiment of the AGP to AGP bridge of the present invention the second AGP read and write request queues have two queues in order to enable bi-directionality. In the case of peer-to-peer replies, these are handled in a two step operation as shown in FIG. 19. The process starts in step 1902. In step 1904, a check is made to determine if a reply is in the second AGP read data return queue 252 (see FIG. 4e). If not, step 1904 is repeated until a reply is in the queue. Otherwise, the reply is transferred to the third AGP read data queue 272. Similarly, peer-to-peer replies in the third AGP read data return queue is handled according to FIG. 20. The process starts in step 2002. A check is made in step 2004 to determine if a reply is in the third AGP read data return queue 272 (see FIG. 4e). If not, step 2004 is repeated until a reply is in the queue. Otherwise, the reply is transferred to the second AGP read data return queue in step 2006.

Figures 21, 22:
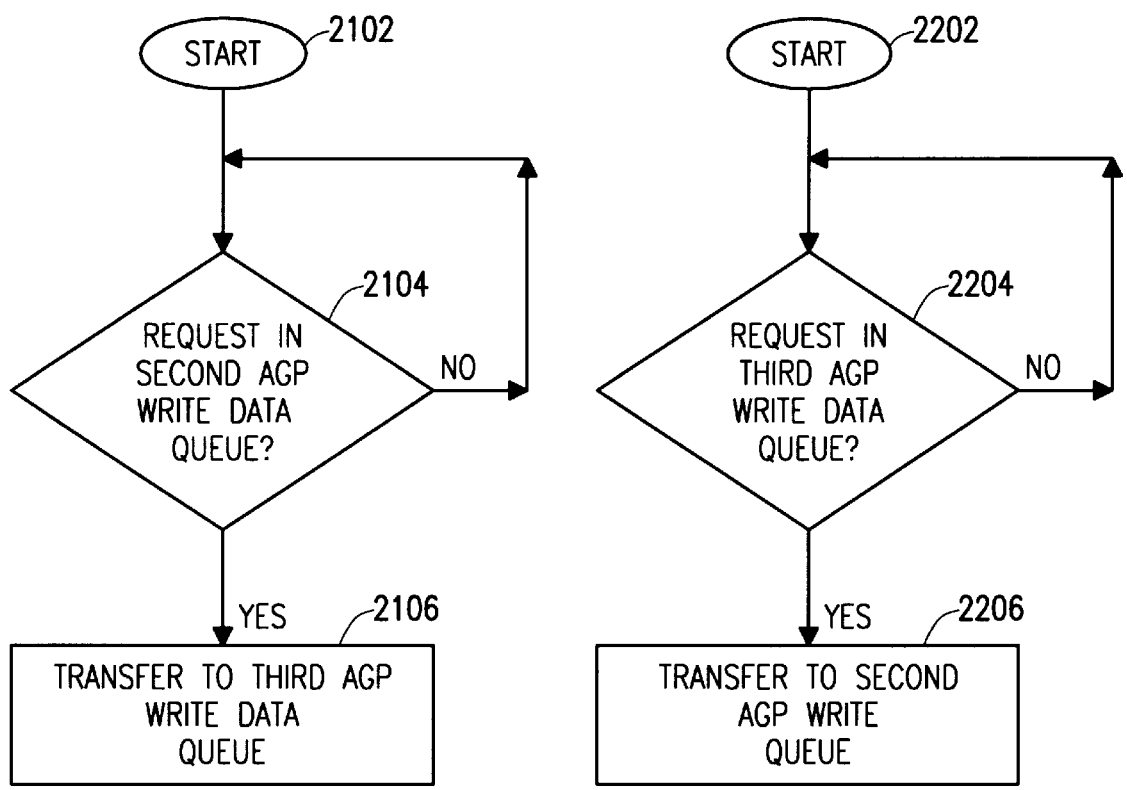
FIG. 21 is a flowchart for peer-to-peer write request in the second AGP write data queue.
FIG. 22 is a flowchart for peer-to-peer write requests in the third AGP write data queue.

Peer-to-peer requests are handled a similar manner to replies. For example, requests in the second AGP write data queue 256 (see FIG. 4e) that are peer-to-peer are handled according to FIG. 21. The process starts at step 2102. In step 2104, a check is made to determine if a request is in the second AGP write data queue 256 (see FIG. 4e). If not, step 2104 is repeated until a request is in the queue. Otherwise, the request is transferred to the third AGP write data queue 276 in step 2106. Similarly, requests in the third AGP write data queue 276 (see FIG. 4e) that are peer-to-peer are handled according to FIG. 22. The process starts at step 2202. In step 2204, a check is made to determine if a request is in the third AGP write data queue 276 (see FIG. 4e). If not, step 2204 is repeated until a request is in the queue. Otherwise, the request is transferred to the second AGP write data queue 256 in step 2206.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those of ordinary skill in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system comprising:

a central processing unit;

a core logic connected to said central processing unit;

system random access memory connected to said core logic;

a first AGP bus connected to said core logic, said first AGP bus is a 32-bit bus;

an AGP to AGP bridge, said AGP to AGP bridge constructed and arranged to connect at least two AGP-compatible devices to said computer system via said first AGP bus, said AGP to AGP bridge further comprising:

a first interface target and arbiter connected to said first AGP bus;

a first read data return queue connected to said first interface target and arbiter;

a first read and write request queue connected to said first interface target and arbiter;

a first write data queue connected to said first interface target and arbiter;

a second interface target and arbiter connected to a second AGP bus;

a second read data return queue connected to said second interface target and arbiter, said second read data return queue further connected to said first read data return queue;

a second read and write request queue connected to said second interface target and arbiter, said second read and write request queue further connected to said first read and write request queue;

a second write data queue connected to said second interface target and arbiter, said second write data queue further connected to said first write data queue;

a third interface target and arbiter connected to a third AGP bus;

a third read data return queue connected to said third interface target and arbiter, said third read data return queue further connected to said first read data return queue;

a third read and write request queue connected to said third interface target and arbiter, said third read and write request queue further connected to said first read and write request queue;

a third write data queue connected to said third interface target and arbiter, said third write data queue further connected to said first write data queue; and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter;

wherein said flow control logic regulates the transfer of requests, replies, and data between said first AGP bus, said second AGP bus and said third AGP bus.

2. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said third interface target and arbiter, said third write data queue further connected to said first write data queue, and a flow control logic, said flow control logic connected to said first data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said second AGP bus, wherein said step (a) further comprises the steps of:
(a1) if the request is on said second AGP bus, then adding said request to said second AGP read and write request queue; and
(a2) reorder request according to a set of ordering rules.

3. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said third interface target and arbiter, said third write data queue further connected to said first write data queue, and a flow control logic, said flow control logic connected to said first data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said second AGP bus, wherein said step (a) further comprises the steps of:
(a1) issuing a signal from said overall flow control logic to start a transaction;
(a2) arbitrating and starting a read reply transaction;
(a3) getting data from said second AGP read data return queue; and
(a4) inserting wait states upon instructions from said flow control logic.

4. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queues, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said third AGP bus, wherein said step (a) further comprises the steps of:
(a1) if the request is on said third AGP bus, then adding said request to said third AGP read and write request queue; and
(a2) reorder requests according to a set of ordering rules.

5. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queues, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said third AGP bus, wherein said step (a) further comprises the steps of:
(a1) issuing a signal from said flow control logic to start a transaction;
(a2) arbitrating and starting a read reply transaction;
(a3) getting data from said third AGP read data return queue; and
(a4) inserting wait states upon instructions from said flow control logic.

6. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said third interface target and arbiter, said third write data queue further connected to said first write data queue, and a flow control logic, said flow control logic connected to said first data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said second AGP bus, wherein said step (a) further comprises the steps of:
(a1) if a request is in said first AGP read and write request queue and if further requests can be queued to said first AGP bus target, then arbitrating and queuing said requests; and
(a2) changing the status of said request in said first AGP read and write request queue.

7. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queues, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said third AGP bus, wherein said step (a) further comprises the steps of:
  (a1) if a request is in said first AGP read and write request queue and if further requests can be queued to said first AGP bus target, then arbitrating and queuing said requests; and
  (a2) changing the status of said request in said first AGP read and write request queue.

8. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said first read and write request queue, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said second AGP bus and said third AGP bus, wherein said step (a) further comprises the steps of:
  (a1) if the request is in said first AGP read and write request queue and if further requests can be queued to said first AGP bus target, then arbitrating and queuing said requests; and
  (a2) changing the status of said request in said first AGP read and write request queue.

9. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said third interface target and arbiter, said third write data queue farther connected to said first write data queue, and a flow control logic, said flow control logic connected to said first data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:
- (a) transferring data between said first AGP bus and said second AGP bus, wherein said step (a) further comprising the steps of:
  - (a1) checking to determine if a reply is in said first AGP bus;
  - (a2) if the result of said step (a1) is positive, then checking to see if said reply is a write;
  - (a3) if the result of said step (a2) is positive, then supplying data from said first AGP write data queue, and retiring from said first AGP read and write request queue and from said first AGP read data return queue and repeating said step (a1);
  - (a4) if the result of step (a2) is negative, then checking to see if said reply is a read;
  - (a5) if the result of step (a4) is negative, then checking to see if said reply is a fence;
  - (a6) if the result of said step (a5) is a positive, then completing the access and triggering said flow control logic and repeating said step (a1);
  - (a7) if the result of said step (a4) is positive, then storing data in said first AGP read data return queue, moving corresponding read request into said first AGP read data return queue, triggering said flow control logic to start moving said data towards either to said second AGP bus or to said third AGP bus;
  - (a8) inserting at least one wait state at a subsequent block if said first AGP read data return queue is full until complete access has been completed on said first AGP bus;
  - (a9) checking to determine if an RBF# has been asserted;
  - (a10) if the result of said step (a9) is negative, then performing said step (a5); and
  - (a11) if the result of said step (a9) is positive, then utilizing a spillover buffer space and inserting wait state on a subsequent boundary, and performing said step (a1).

10. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queues, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:
- (a) transferring data between said first AGP bus and said third AGP bus, wherein said step (a) further comprising the steps of:
  - (a1) checking to determine if a reply is in said first AGP bus;
  - (a2) if the result of said step (a1) is positive, then checking to see if said reply is a write;
  - (a3) if the result of said step (a2) is positive, then supplying data from said first AGP write data queue, and retiring from said first AGP read and write request queue and from said first AGP read data return queue and repeating said step (a1);
  - (a4) if the result of said step (a2) is negative, then checking to see if said reply is a read;
  - (a5) if the result of said step (a4) is negative, then checking to see if said reply is a fence;
  - (a6) if the result of said step (a5) is positive, then completing the access and triggering said flow control logic and repeating said step (a1);
  - (a7) if the result of said step (a4) is positive, then storing data in said first AGP read data return queue, moving corresponding read request into said first AGP read data return queue, triggering said flow control logic to start moving said data towards either to said second AGP bus or to said AGP bus;
  - (a8) inserting at least one wait state at a subsequent block if said first AGP read data return queue is full until complete access has been completed on said first AGP bus;
  - (a9) checking to determine if an RBF# has been asserted;
  - (a10) if the result of said step (a9) is negative, then performing said step (a5); and
  - (a11) if the result of said step (a9) is positive, then utilizing a spillover buffer space and inserting wait state on a subsequent boundary, and performing said step (a1).

11. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said first read and write request queue, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said second AGP bus and said third AGP bus, wherein said step (a) further comprising the steps of:

(a1) checking to determine if a reply is in said first AGP bus;

(a2) if the result of said step (a1) is positive, then checking to see if said reply is a write;

(a3) if the result of said step (a2) is positive, then supplying data from said first AGP write data queue, and retiring from said first AGP read and write request queue and from said first AGP read data return queue and repeating said step (a1);

(a4) if the result of said step (a2) is negative, then checking to see if said reply is a read;

(a5) if the result of said step (a4) is negative, then checking to see if said reply is a fence;

(a6) if the result of said step (a5) is positive, then completing the access and triggering said flow control logic and repeating said step (a1);

(a7) if the result of said step (a4) is positive, then storing data in said first AGP read data return queue, moving corresponding read request into said first AGP read data return queue, triggering said flow control logic to start moving said data towards either to said second AGP bus or to said third AGP bus;

(a8) inserting at least one wait state at a subsequent block if said first AGP read data return queue is full until complete access has been completed on said first AGP bus;

(a9) checking to determine if an RBF# has been asserted;

(a10) if the result of said step (a9) is negative, then performing said step (a); and (a11) if the result of said step (a9) is positive, then utilizing a spillover buffer space and inserting wait state on a subsequent boundary, and performing said step (a1).

12. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said third interface target and arbiter, said third write data queue further connected to said first write data queue, and a flow control logic, said flow control logic connected to said first data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said second AGP bus, wherein said step (a) further comprises the steps of (a1) checking to determine if a request is in said second AGP read and write request queue;

(a2) if the result of said step (a1) is negative, then handling said request as being in said third AGP read and write request queue;

(a3) if the result of said step (a1) is positive, then checking to determine if said request is a write;

(a4) if the result of said step (a3) is positive, then checking to determine if said write request is complete in said second AGP bus;

(a5) if said result of said step (a4) is positive, then handling said request as being in said third AGP read and write request queue;

(a6) if the result of said step (a4) is negative, then checking to determine if there is pace in said second AGP write data queue for an entire access;

(a7) if the result in said step (a6) is negative, then handling said request as being in said third AGP read and write request queue;

(a8) if said result of said step (a6) is positive, then running a write cycle on said second AGP bus and storing write data in said second AGP write data queue, and marking said request as completed on said second AGP bus;

(a9) after said step (a8), or if said result of said step (a2) is negative, then checking to determine if space is available in said first AGP read and write request queue;

(a10) if said result of said step (a9) is negative, then executing said step (a1);

(a11) if said result of said step (a9) is positive, then checking to determine if said request is a write;

(a12) if the result of said step (a11) is negative, then transferring said request to said first AGP read and write request queue and re-ordering said first AGP read and write request queue according to a set of ordering rules and then handling said request as being in said third AGP read and write request queue;

(a13) if said result of said step (a11) is positive, then checking to determine if there is pace available in said first AGP write data queue;

(a14) if the result of said step (a13) is negative, then executing said step (a1); and (a15) if said result of said step (a13) is positive, then transferring data and transferring said request to said first AGP write data queue, reordering said first AGP write data queue according to a set of ordering rules, and then handling said request as being in said third AGP read and write request queue.

13. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queues, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said third AGP bus, wherein said step (a) further comprises the steps of (a1) checking to determine if a request is in said second AGP read and write request queue;

(a2) if the result of said step (a1) is negative, then handling said request as being in said third AGP read and write request queue;

(a3) if the result of said step (a1) is positive, then checking to determine if said request is a write;

(a4) if the result of said step (a3) is positive, then checking to determine if said write request is complete in said second AGP bus;

(a5) if said result of said step (a4) is positive, then handling said request as being in said third AGP read and write request queue;

(a6) if the result of said step (a4) is negative, then checking to determine if there is space in said second AGP write data queue for an entire access;

(a7) if the result of said step (a6) is negative, then handling said request as being in said third AGP read and write request queue;

(a8) if said result of said step (a6) is positive, then running a write cycle on said second AGP bus and storing write data in said second AGP write data queue, and marking said request as completed on said second AGP bus;

(a9) after said step (a8), or if said result of said step (a2) is negative, then checking to determine if space is available in said first AGP read and write request queue;

(a10) if said result of said step (a9) is negative, then executing said step (a1);

(a11) if said result of said step (a9) is positive, then checking to determine if said request is a write;

(a12) if the result of said step (a11) is negative, then transferring said request to said first AGP read and write request queue and re-ordering said first AGP read and write request queue according to a set of ordering rules and then handling said request as being in said third AGP read and write request queue;

(a13) if said result of said step (a11) is positive, then checking to determine if there is space available in said first AGP write data queue;

(a14) if the result of said step (a13) is negative, then executing said step (a1); and (a15) if said result of said step (a13) is positive, then transferring data and transferring said request to said first AGP write data queue according to a set of ordering rules, and then handling said request as being in said third AGP read and write request queue.

14. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said third interface target and arbiter, said third write data queue further connected to said first write data queue, and a flow control logic, said flow control logic connected to said first data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said second AGP bus, wherein said step (a) further comprises the steps of:

(a1) checking to determine if a request is in said third AGP read and write request queue;

(a2) if the result of said step (a1) is negative, then handling said request as being in said second AGP read and write request queue;

(a3) if the result of said step (a1) is positive, then checking to determine if said request is a write;

(a4) if the result of said step (a3) is positive, then checking to determine if said write request is complete in said second AGP bus;

(a5) if the result of said step (a4) is negative, then checking to determine if there is space in said third AGP write data queue for an entire access;

(a6) if the result of said step (a5) is negative, then executing said step (a1);

(a7) if said result of said step (a5) is positive, then running a write cycle on said third AGP bus and storing write data in said third AGP write data queue, and marking said request as completed on said third AGP bus;

(a8) after said step (a7), or if said result of said step (a3) is negative, or if said result of said step (a4) is positive, then checking to determine if space is available in said first AGP read and write request queue;

(a9) if said result of said step (a8) is negative, then executing said step (a1);

(a10) if said result of said step (a8) is positive, then checking to determine if said request is a write;

(a11) if the result of said step (a10) is negative, then transferring said request to said first AGP read and write request queue and re-ordering said first AGP read and write request queue according to a set of ordering rules and then handling said request as being in said second AGP read and write request queue;

(a12) if said result of said step (a10) is positive, then checking to determine if there is space available in said first AGP write data queue;

(a13) if the result of said step (a12) is negative, then executing said step (a1); and (a14) if said result of said step (a12) is positive, then transferring data and transferring said request to said first AGP write data queue, reordering said first AGP write data queue according to a set of ordering rules, and then handling said request as being in said second AGP read and write request queue.

15. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queues, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said third AGP bus, wherein said step (a) further comprises the steps of:

(a1) checking to determine if a request is in said third AGP read and write request queue;

(a2) if the result of said step (a1) is negative, then handling said request as being in said second AGP read and write request queue;

(a3) if the result of said step (a1) is positive, then checking to determine if said request is a write;

(a4) if the result of said step (a3) is positive, then checking to determine if said write request is complete in said second AGP bus;

(a5) if the result of said step (a4) is negative, then checking to determine if there is space in said third AGP write data queue for an entire access;

(a6) if the result of said step (a5) is negative, then executing said step (a1);

(a7) if said result of said step (a5) is positive, then running a write cycle on said third AGP bus and storing write data in said third AGP write data queue, and marking said request as completed on said third AGP bus;

(a8) after said step (a7), or if said result of said step (a3) is negative, or if said result of said step (a4) is positive, then checking to determine if space is available in said first AGP read and write request queue;

(a9) if said result of said step (a8) is negative, then executing said step (a1);

(a10) if said result of said step (a8) is positive, then checking to determine if said request is a write;

(a11) if the result of said step (a10) is negative, then transferring said request to said first AGP read and write request queue and re-ordering said first AGP read and write request queue according to a set of ordering rules and then handling said request as being in said second AGP read and write request queue;

(a12) if said result of said step (a10) is positive, then checking to determine if there is space available in said first AGP write data queue;

(a13) if the result of said step (a12) is negative, then executing said step (a1); and (a14) if said result of said step (a12) is positive, then transferring data and transferring said request to said first AGP write data queue, reordering said first AGP write data queue according to a set of ordering rules, and then handling said request as being in said second AGP read and write request queue.

16. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said third interface target and arbiter, said third write data queue further connected to said first write data queue, and a flow control logic, said flow control logic connected to said first data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said second AGP bus, wherein said step (a) further comprises the steps of:

(a1) checking to determine if a next read request on said first AGP read and write request queue is small enough to fit within an internal buffer space within said AGP to AGP bridge;

(a2) if the result of said step (a1) is positive, then executing said step (a1);

(a3) if said result of said step (a1) is negative, then checking to determine if said next read request is from said second AGP bus;

(a4) if said result of said step (a3) is negative, then checking to determine if an RBF# has been asserted on said second AGP bus;

(a5) if the result of said step (a4) is negative, then executing said step (a1);

(a6) if the result of said step (a4) is positive, then asserting an RBF# on said first AGP bus;

(a7) checking to determine if said RBF# on said second AGP bus is deasserted;

(a8) if the result of step (a7) is negative, then executing said step (a7);

(a9) if said result of step (a7) is positive, then deasserting said RBF# of said first AGP bus and then executing said step (a1);

(a10) if said result of said step (a3) is negative, then checking to determine if said next read request is from said third AGP bus;

(a11) if the result of said step (a10) is positive, then checking to determine if an RBF# on said third AGP bus has been asserted;

(a12) if the result of said step (a11) is negative the executing said step (a1);

(a13) if said result of said step (a11) is positive, then asserting said RBF# of said first AGP bus;

(a14) checking to determine if said RBF# of said third AGP bus is deasserted;

(a15) if the result of said step (a14) is negative, then executing said step (a14); and (a16) if said result of said step (a14) is positive, then deasserting said RBF# of said first AGP bus and executing said step (a1).

17. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queues, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said third AGP bus, wherein said step (a) further comprises the steps of:
    (a1) checking to determine if a next read request on said first AGP read and write request queue is small enough to fit within an internal buffer space within said AGP to AGP bridge;
    (a2) if the result of said step (a1) is positive, then executing said step (a1);
    (a3) if said result of said step (a1) is negative, then checking to determine if said next read request is from said second AGP bus;
    (a4) if said result of said step (a3) is positive, then checking to determine if an RBF# has been asserted on said second AGP bus;
    (a5) if the result of said step (a4) is negative, then executing said step (a1);
    (a6) if the result of said step (a4) is positive, then asserting an RBF# on said first AGP bus;
    (a7) checking to determine if said RBF# on said second AGP bus is deasserted;
    (a8) if the result of step (a7) is negative, then executing step (a7);
    (a9) if said result of step (a7) is positive, then deasserting said RBF# of said first AGP bus and then executing said step (a1);
    (a10) if said result of said step (a3) is negative, then checking to determine if said next read request is from said third AGP bus;
    (a11) if the result of said step (a10) is positive, then checking to determine if an RBF# on said third AGP bus has been asserted;
    (a12) if the result of said step (a11) is negative then executing said step (a1);
    (a13) if said result of said step (a11) is positive, then asserting said RBP# of said first AGP bus;
    (a14) checking to determine if said RBF# of said third AGP bus is deasserted;
    (a15) if the result of said step (a14) is negative, then executing said step (a14); and
    (a16) if said result of said step (a14) is positive, then deasserting said RBF# of said first AGP bus and executing said step (a1).

18. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said third interface target and arbiter, said third write data queue further connected to said first write data queue, and a flow control logic, said flow control logic connected to said first data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said second AGP bus, wherein said step (a) further comprises the steps of:
    (a1) checking to determine if a reply in said first AGP read data return queue;
    (a2) if the result of said step (a1) is positive, then checking to determine if said replay is for said second AGP bus;
    (a3) if the result of said step (a2) is positive, then checking to determine if sufficient space exists within said second AGP read data queue;
    (a4) if the result of said step (a3) is positive, then transferring data to said second read data return queue; triggering said second AGP bus interface to start transacting on said second AGP bus, completing said transfer of said request, otherwise waiting for said second AGP read data return queue to empty in order to complete said transfer, and then executing said step (a1);

(a5) if said result of said step (a2) is negative, then checking to determine if said reply is for said third AGP bus;

(a6) if the result of said step (a5) is positive, then checking to determine if space is available to fulfill said request in said third read data return queue; and (a7) if the result of said step (a6) is positive, then transferring data to said third read data return queue, triggering said third AGP bus interface to start transacting on said third AGP bus, completing said transfer of said request, and then executing said step (a1).

19. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queues, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said first AGP bus and said third AGP bus, wherein said step (a) further comprises the steps of:

(a1) checking to determine if a reply in said first AGP read data return queue;

(a2) if the result of said step (a1) is positive, then checking to determine if said replay is for said second AGP bus;

(a3) if the result of said step (a2) is positive, then checking to determine if sufficient space exists within said second AGP read data queue;

(a4) if the result of said step (a3) is positive, then transferring data to said second read data return queue, triggering said second AGP bus interface to start transacting on said second AGP bus, completing said transfer of said request, otherwise waiting for said second AGP read data return queue to empty in order to complete said transfer, and then executing said step (a1);

(a5) if said result of said step (a2) is negative, then checking to determine if said reply is for said third AGP bus;

(a6) if the result of said step (a5) is positive, then checking to determine if space is available to fulfill said request in said third read data return queue; and (a7) if the result of said step (a6) is positive, then transferring data to said third read data return queue, triggering said third AGP bus interface to start transacting on said third AGP bus, completing said transfer of said request, and then executing said step (a1).

20. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said first read and write request queue, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said second AGP bus and said third AGP bus, wherein said step (a) further comprises the steps of:
 (a1) checking to determine if a request in said second AGP read and write request queue;
 (a2) if the result of said step (a1) is negative, then executing said step (a1);
 (a3) if said result of said step (a1) is positive, then checking to determine if said request is a peer-to-peer request;
 (a4) if the result of said step (a3) is negative, then transferring said request to said first AGP read and write request queue; and
 (a5) if said result of said step (a3) is positive, then transferring said request to said third AGP read and write request queue.

21. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said first read and write request queue, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:
 (a) transferring data between said second AGP bus and said third AGP bus, wherein said step (a) further comprises the steps of:
  (a1) checking to determine if a request in said third AGP read and write request queue;
  (a2) if the result of said step (a1) is negative, then executing said step (a1);
  (a3) if said result of said step (a1) is positive, then checking to determine if said request is a peer-to-peer request;
  (a4) if the result of said step (a3) is negative, then transferring said request to said first AGP read and write request queue; and
  (a5) if said result of said step (a3) is positive, then transferring said request to said second AGP read and write request queue.

22. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said first read and write request queue, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:
 (a) transferring data between said second AGP bus and said third AGP bus, wherein said step (a) further comprises the steps of:
  (a1) checking to determine if a reply is in said second AGP read data return queue;
  (a2) if the result of said step (a1) is negative, then executing said step (a1); and
  (a3) if said result of said step (a1) is positive, then transferring data to said third AGP read data return queue.

23. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said first read and write request queue, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:
  (a) transferring data between said second AGP bus and said third AGP bus, wherein said step (a) further comprises the steps of:
    (a1) checking to determine if a reply is in said third AGP read data return queue;
    (a2) if the result of said step (a1) is negative, then executing said step (a1); and
    (a3) if said result of said step (a1) is positive, then transferring data to said second AGP read data return queue.

24. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said first read and write request queue, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:
  (a) transferring data between said second AGP bus and said third AGP bus, wherein said step (a) further comprises the steps of:
    (a1) checking to determine if a request is in said second AGP write data queue;
    (a2) if the result of said step (a1) is negative, then executing said step (a1);
    (a3) if said result of said step (a1) is positive, then transferring data to said third AGP write data queue.

25. A method of transferring data within a computer system, said computer system having a central processing unit, a core logic connected to said central processing unit, system random access memory connected to said core logic, and a first AGP bus connected to said core logic, said computer system further having an AGP to AGP bridge, said AGP to AGP bridge constructed and arranged to connect at least two AGP-compatible devices to said computer system via said first AGP bus, said AGP to AGP bridge further having a first interface target and arbiter connected to said first AGP bus, a first read data return queue connected to said first interface target and arbiter, a first read and write request queue connected to said first interface target and arbiter, a first write data queue connected to said first interface target and arbiter, a second interface target and arbiter connected to a second AGP bus, a second read data return queue connected to said second interface target and arbiter, said second read data return queue further connected to said first read data return queue, a second read and write request queue connected to said second interface target and arbiter, said second read and write request queue further connected to said first read and write request queue, a second write data queue connected to said second interface target and arbiter, said second write data queue further connected to said first write data queue, a third interface target and arbiter connected to a third AGP bus, a third read data return queue connected to said third interface target and arbiter, said third read data return queue further connected to said first read data return queue, a third read and write request queue connected to said third interface target and arbiter, said third read and write request queue further connected to said first read and write request queue, a third write data queue connected to said first read and write request queue, a third write data queue connected to said third interface target and arbiter, said third write data queue further connected to said first write data queue, and a flow control logic, said flow control logic connected to said first read data return queue, said first read and write request queue, said first write data queue, said first interface target and arbiter, said second read data return queue, said second read and write request queue, said second write data queue, said second interface target and arbiter, said third read data return queue, said third read and write request queue, said third write data queue, and said third interface target and arbiter, said method comprising the steps of:

(a) transferring data between said second AGP bus and said third AGP bus, wherein said step (a) further comprises the steps of:
  (a1) checking to determine if a request is in said third AGP write data queue;
  (a2) if the result of said step (a1) is negative, then executing said step (a1);
  (a3) if said result of said step (a1) is positive, then transferring data to said second AGP write data queue.

* * * * *

UNITED STATES PATENT AND TRADEMARK OFFICE
CERTIFICATE OF CORRECTION

PATENT NO. : 6,167,476
DATED : DECEMBER 26, 2000
INVENTOR(S) : SOMPONG P. OLARIG/USHA RAJAGOPALAN/RONALD T. HORAN

It is certified that error appears in the above-identified patent and that said Letters Patent is hereby corrected as shown below:

In column 31, line 63, delete "(a)" and insert --(a5)--.

Signed and Sealed this

Twenty-ninth Day of May, 2001

Attest:

NICHOLAS P. GODICI

Attesting Officer

Acting Director of the United States Patent and Trademark Office